United States Patent
Hwang et al.

(10) Patent No.: US 12,267,750 B2
(45) Date of Patent: Apr. 1, 2025

(54) METHOD FOR TERMINAL TO TRANSMIT AND RECEIVE SIGNAL IN WIRELESS COMMUNICATION SYSTEM

(71) Applicant: LG ELECTRONICS INC., Seoul (KR)

(72) Inventors: Jaeho Hwang, Seoul (KR); Hakseong Kim, Seoul (KR); Hanbyul Seo, Seoul (KR); Myoungseob Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 548 days.

(21) Appl. No.: 17/618,703

(22) PCT Filed: Jun. 15, 2020

(86) PCT No.: PCT/KR2020/007736
§ 371 (c)(1),
(2) Date: Dec. 13, 2021

(87) PCT Pub. No.: WO2020/251335
PCT Pub. Date: Dec. 17, 2020

(65) Prior Publication Data
US 2022/0248176 A1    Aug. 4, 2022

(30) Foreign Application Priority Data
Jun. 13, 2019  (KR) .......................... 10-2019-0069946

(51) Int. Cl.
*H04W 4/44*   (2018.01)
*H04W 4/02*   (2018.01)
(Continued)

(52) U.S. Cl.
CPC ........... *H04W 4/025* (2013.01); *H04W 4/024* (2018.02); *H04W 4/20* (2013.01); *H04W 4/44* (2018.02)

(58) Field of Classification Search
CPC ....... H04W 4/025; H04W 4/024; H04W 4/20; H04W 4/44; H04W 88/02; H04W 92/18
See application file for complete search history.

(56) References Cited

U.S. PATENT DOCUMENTS

| | | | |
|---|---|---|---|
| 2008/0095134 A1* | 4/2008 | Chen ..................... | H04W 40/32 370/342 |
| 2009/0154379 A1* | 6/2009 | Hayashi ................ | H04W 72/04 370/280 |

(Continued)

FOREIGN PATENT DOCUMENTS

| KR | 1020170116708 A | 10/2017 | |
|---|---|---|---|
| WO | WO-2018031458 A1 * | 2/2018 | ............. H04L 61/35 |

OTHER PUBLICATIONS

J. Parikh, et al., "Software Tools for: Connected Work Zone Mapping and Message Building", Mar. 26, 2018.

*Primary Examiner* — Marcus Hammonds
(74) *Attorney, Agent, or Firm* — BRYAN CAVE LEIGHTON PAISNER LLP

(57) ABSTRACT

One embodiment is a method for performing an operation for a terminal in a wireless communication system, the method including: a step for transmitting a first message to one or more road side units (RSUs); and a step for transmitting a second message to the one or more RSUs, wherein the first message includes location information about each of the one or more RSUs, the location information being acquired by recognizing unique information about each of the one or more RSUs, and the second message includes a location list obtained by collecting the location information about each of the one or more RSUs.

10 Claims, 36 Drawing Sheets

(51) Int. Cl.
*H04W 4/024* (2018.01)
*H04W 4/20* (2018.01)

(56) References Cited

U.S. PATENT DOCUMENTS

| | | |
|---|---|---|
| 2017/0053530 A1 | 2/2017 | Gogic et al. |
| 2017/0092126 A1 | 3/2017 | Oshida et al. |
| 2018/0279183 A1* | 9/2018 | Song .................... G05D 1/0276 |
| 2020/0280842 A1* | 9/2020 | Liu ....................... H04L 9/3268 |
| 2022/0116738 A1* | 4/2022 | McCutchin ........... H04W 4/022 |
| 2022/0327929 A1* | 10/2022 | Hwang ............ G08G 1/096783 |

* cited by examiner

● : Transmitting UE
○ : Receiving UE

FIG. 18

| Header | Work Zone Container | Setting Container | Event Container |
|---|---|---|---|

(a) DF_RSM message structure

| ASN.1 Representation | | |
|---|---|---|
| DF_RSM | ::= SEQUENCE { | |
|   Header | DF_ITS_Header | |
|   WorkZoneConatiner | DF_WorkzoneContainer | |
|   SettingContainer | DF_SettingContainer | ,Optional |
|   EventContainer | DF_EventContainer | ,Optional |
| } | | |

(b) ASN.1 representation format of DF_RSM

FIG. 19

| ASN.1 Representation | |
|---|---|
| DF_WorkzoneContainer | ::= SEQUENCE { |
| WorkzoneID | INTEGER |
| WorkzoneType | DE_WorkzoneType |
| WorkPeriodStart | DF_Timestamplts |
| WorkPeriodEnd | DF_Timestamplts |
| WorkzoneLevel | INTEGER |
| } | |

( a ) workzone Container

| ASN.1 Representation | |
|---|---|
| DF_Workzone Type | ::= INTEGER { |
| unknown | 0, |
| Road pavement | 1, |
| Road paint | 2, |
| Road cleaning | 3, |
| Road repair | 4, |
| } | |

( b ) Data element of WorkzoneType

| ASN.1 Representation | |
|---|---|
| DF_SettingContainer | ::= SEQUENCE { |
| SettingType | INTEGER |
| TimeOutValue | INTEGER |
| PointPosition | DF_ReferancePosition |
| PointPositionList | SEQUENCE (SIZE(1..100)) OF DE_Position |
| } | |

( c ) Setting Container

FIG. 20

| Header | Work Zone Container | Setting Container | Event Container |

(a) DF_SoftV2X message structure

| ASN.1 Representation | |
|---|---|
| DF_RSM | ::= SEQUENCE { |
|   Header | DF_ITS_Header |
|   WorkZoneConatiner | DF_WorkzoneContainer |
|   SettingContainer | DF_SettingContainer ,Optional |
|   EventContainer | DF_EventContainer ,Optional |
| } | |

(b) ASN.1 representation format of DF_SoftV2XHeader

| ASN.1 Representation | | |
|---|---|---|
| DF_SoftV2XHeader | ::= SEQUENCE { | |
|   StationID | INTEGER | |
|   MessageType | INTEGER | -- 1, req, 2: ack, 3:... |
|   MessageGenTime | INTEGER | |
|   MessageErgency | INTEGER | |
|   StationPosition | DF_Position | |
| } | | |

(c) DF_SoftV2XHeader structure (a) System feature of Handheld Device (b) System structure of Handheld device

METHOD FOR TERMINAL TO TRANSMIT AND RECEIVE SIGNAL IN WIRELESS COMMUNICATION SYSTEM

This application is the National Stage filing under 35 U.S.C. 371 of International Application No. PCT/KR2020/007736 filed on Jun. 15, 2020, which claims priority to Korean Patent Application No. 10-2019-0069946 filed on Jun. 13, 2019, the contents of which are all hereby incorporated by reference herein in their entirety.

TECHNICAL FIELD

The following description relates to a wireless communication system, and more particularly, to a method of transmitting and receiving signals by a UE for a construction site guidance system and apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A wireless communication system uses various radio access technologies (RATs) such as long term evolution (LTE), LTE-advanced (LTE-A), and wireless fidelity (WiFi). $5^{th}$ generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services that will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

DISCLOSURE

Technical Task

One technical task of embodiment(s) is to generate construction site information by reflecting information changing in real time using an RSU installed around a construction site.

Another technical task of embodiment(s) is to reduce installation costs by simplifying a structure of an RSU installed around a construction site.

It will be appreciated by persons skilled in the art that technical tasks that could be achieved with the present disclosure are not limited to what has been particularly described hereinabove and the above and other objects that the present disclosure could achieve will be more clearly understood from the following detailed description.

Technical Solutions

In one technical aspect of the present disclosure, provided is a method of performing an operation for a user equipment in a wireless communication system, the method including transmitting a first message to one or more Road Side Units (RSUs) and transmitting a second message to the one or more RSUs, wherein the first message may include location information of each of the one or more RSUs acquired in a manner of recognizing unique information of each of the one or more RSUs and wherein the second message may include a position list of collecting location information of each of the one or more RSUs.

In another technical aspect of the present disclosure, provided is a user equipment in a wireless communication system, the user equipment including at least one processor and at least one computer memory operatively connected to the at least one processor and storing instructions enabling the at least one processor to perform operations when executed, the operations including transmitting a first message to one or more Road Side Units (RSUs) and transmitting a second message to the one or more RSUs, wherein the first message may include location information of each of the one or more RSUs acquired in a manner of recognizing unique information of each of the one or more RSUs and wherein the second message may include a position list of collecting location information of each of the one or more RSUs.

In further technical aspect of the present disclosure, provided is a computer-readable storage medium configured to store at least one computer program including an instruction enabling at least one processor to perform operations for a User Equipment (UE) when executed by the at least one processor, the operations including transmitting a first message to one or more Road Side Units (RSUs) and transmitting a second message to the one or more RSUs, wherein the first message may include location information of each of the one or more RSUs acquired in a manner of recognizing unique information of each of the one or more RSUs and wherein the second message may include a position list of collecting location information of each of the one or more RSUs.

The second message may be transceived between the one or more RSUs.

The one or more RSUs may transmit a safety message to a vehicle based on the second message and the safety message may include construction site area information of a construction site area having the one or more RSUs located therein.

The method may further include making a request for construction site common information to a base station or a soft V2X server and receiving the construction site common information from the base station or the soft V2X server.

Each of the first message and the second message may include the construction site common information.

The construction site common information may include information on a construction type or a construction period.

The method may further include transmitting the second message to a base station or a V2X server, and the base station or the V2X sever may transmit a safety message to a vehicle based on the second message.

The UE may be an autonomous vehicle or included in an autonomous vehicle.

Advantageous Effects

According to one embodiment, information on a construction site area, which changes in real time, can be generated accurately and promptly using a UE and an RSU.

According to one embodiment, as location information of one or more RSUs is obtained using a UE, a structure of the RSU is simplified to reduce costs.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements. In the drawings:

FIGS. 12 to 27 are diagrams to describe embodiment(s); and

BEST MODE FOR DISCLOSURE

In various embodiments of the present disclosure, "/" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). $3^{rd}$ generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
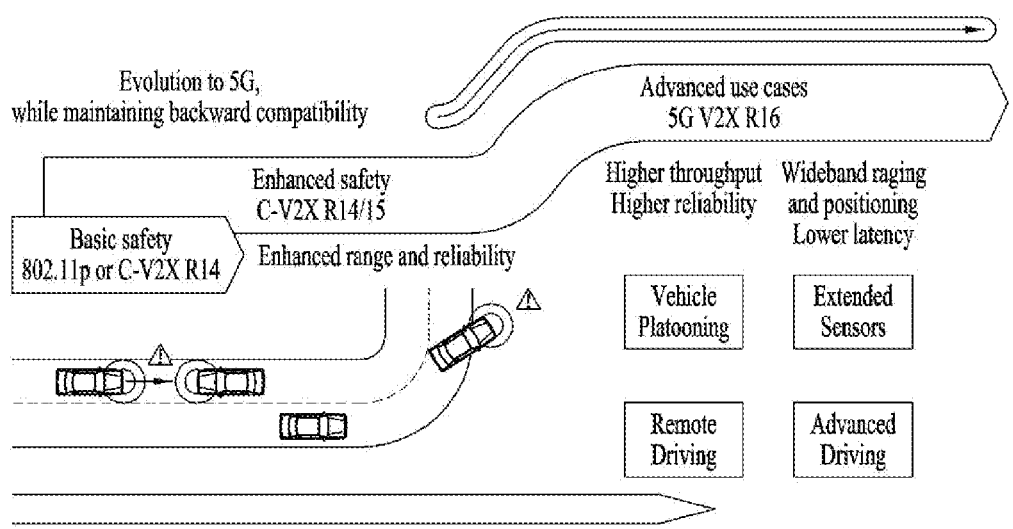
FIG. 1 is a diagram illustrating vehicle-to-everything (V2X) communication based on pre-new radio access technology (NR) RAT and V2X communication based on NR in comparison.
Figure 2:
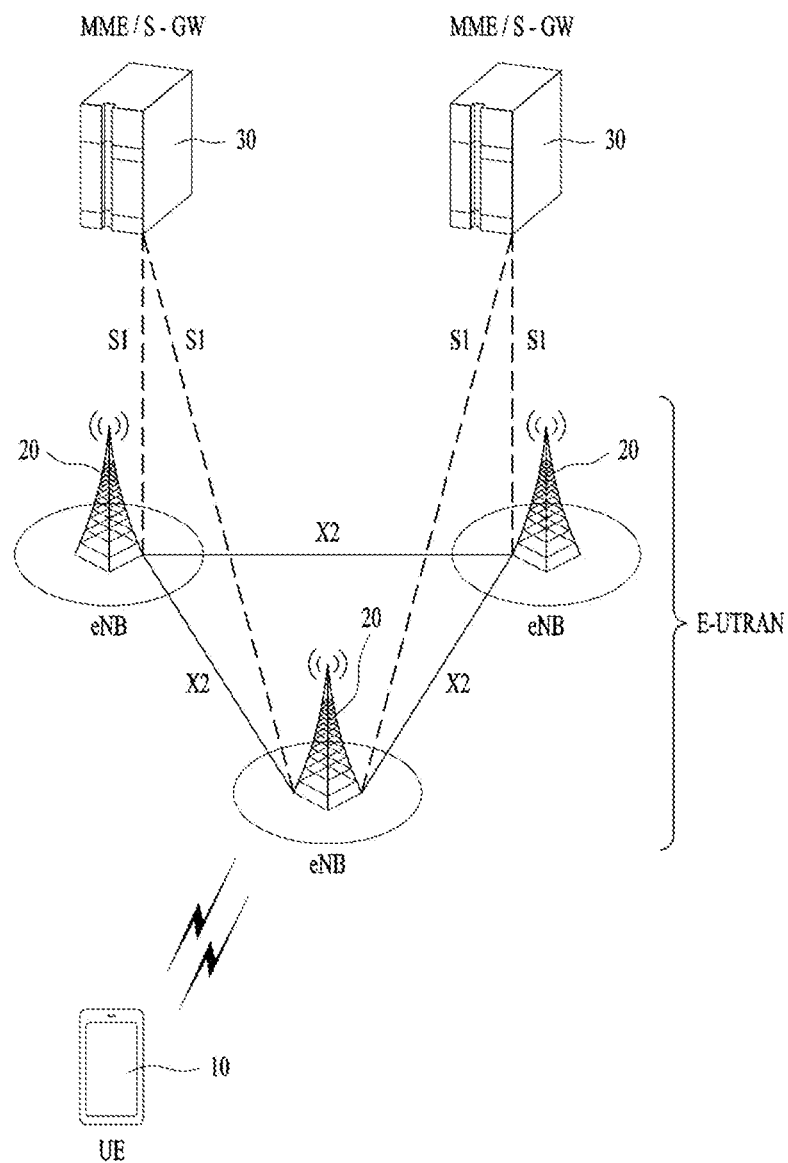
FIG. 2 is a diagram illustrating the structure of a long term evolution (LTE) system according to an embodiment of the present disclosure.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
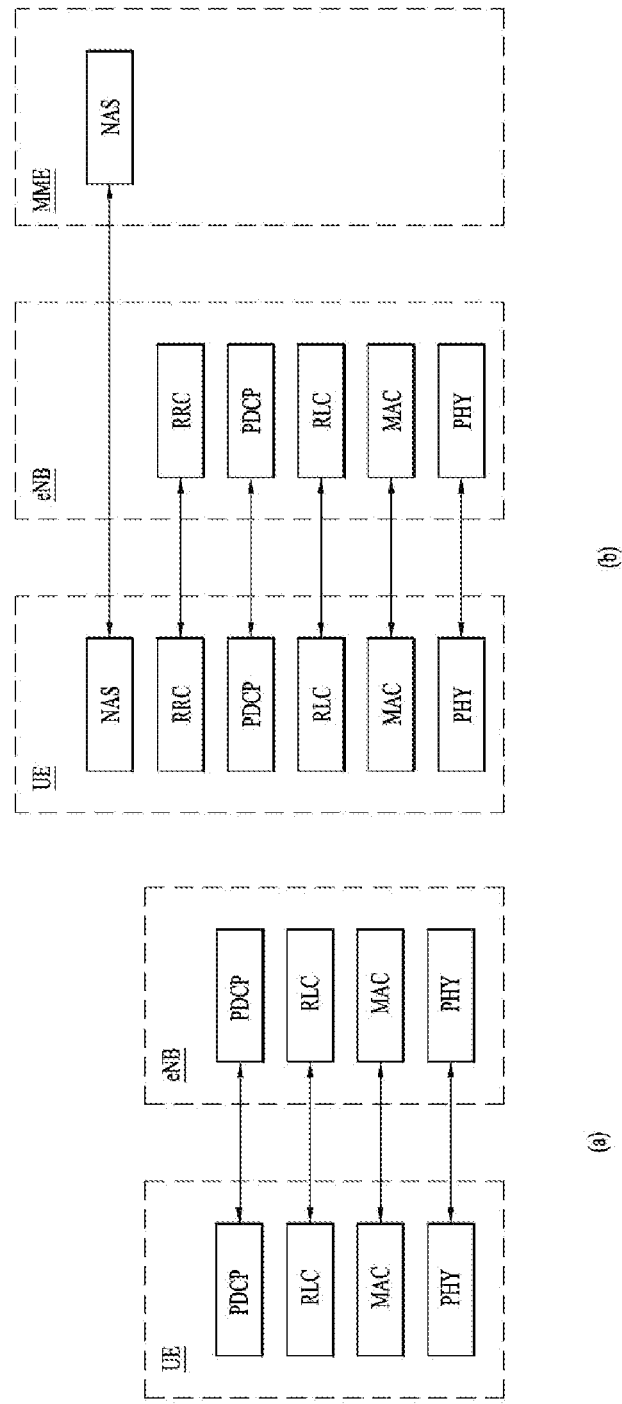
FIG. 3 is a diagram illustrating user-plane and control-plane radio protocol architectures according to an embodiment of the present disclosure.

FIG. 3(*a*) illustrates a user-plane radio protocol architecture according to an embodiment of the disclosure.

FIG. 3(*b*) illustrates a control-plane radio protocol architecture according to an embodiment of the disclosure. A user plane is a protocol stack for user data transmission, and a control plane is a protocol stack for control signal transmission.

Referring to FIGS. 3(*a*) and 3(*b*), the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbol in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel A transmission time interval (TTI) is a unit time for subframe transmission.

Figure 4:
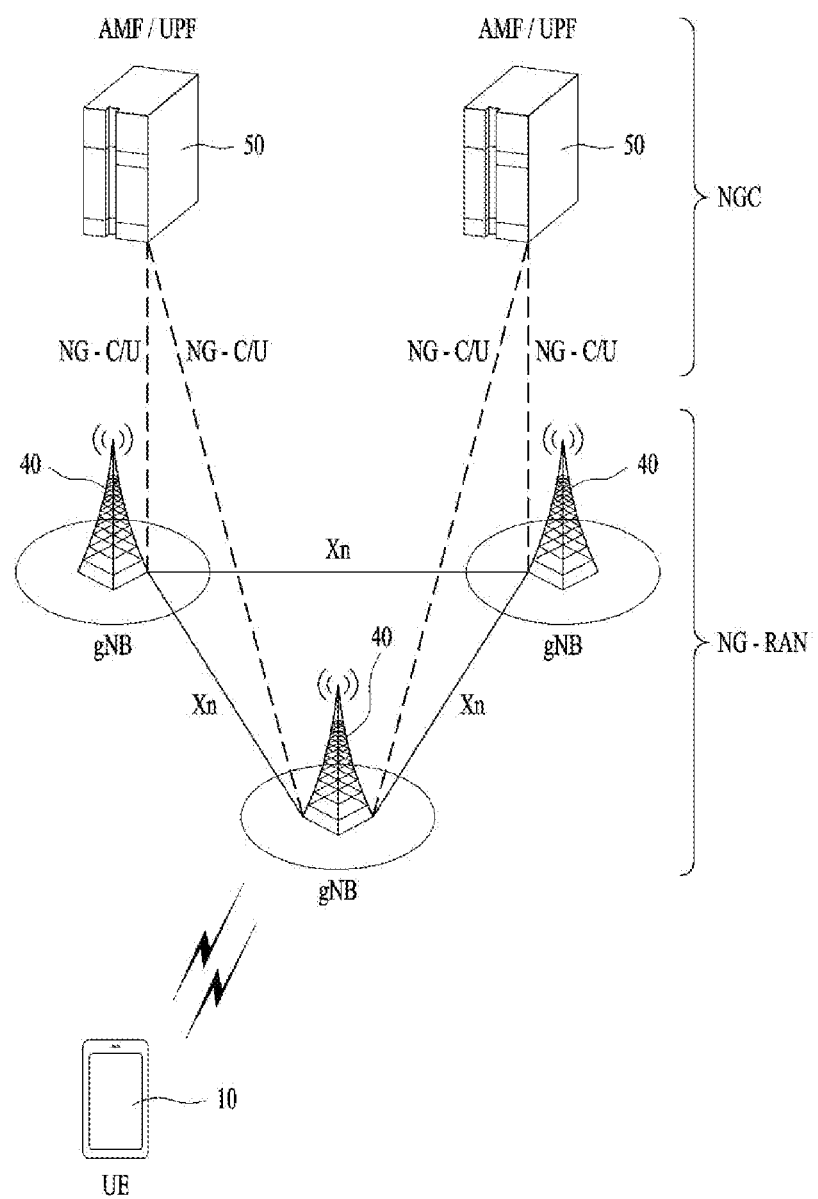
FIG. 4 is a diagram illustrating the structure of an NR system according to an embodiment of the present disclosure.

FIG. 4 illustrates the structure of an NR system according to an embodiment of the present disclosure.

Referring to FIG. 4, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 5:
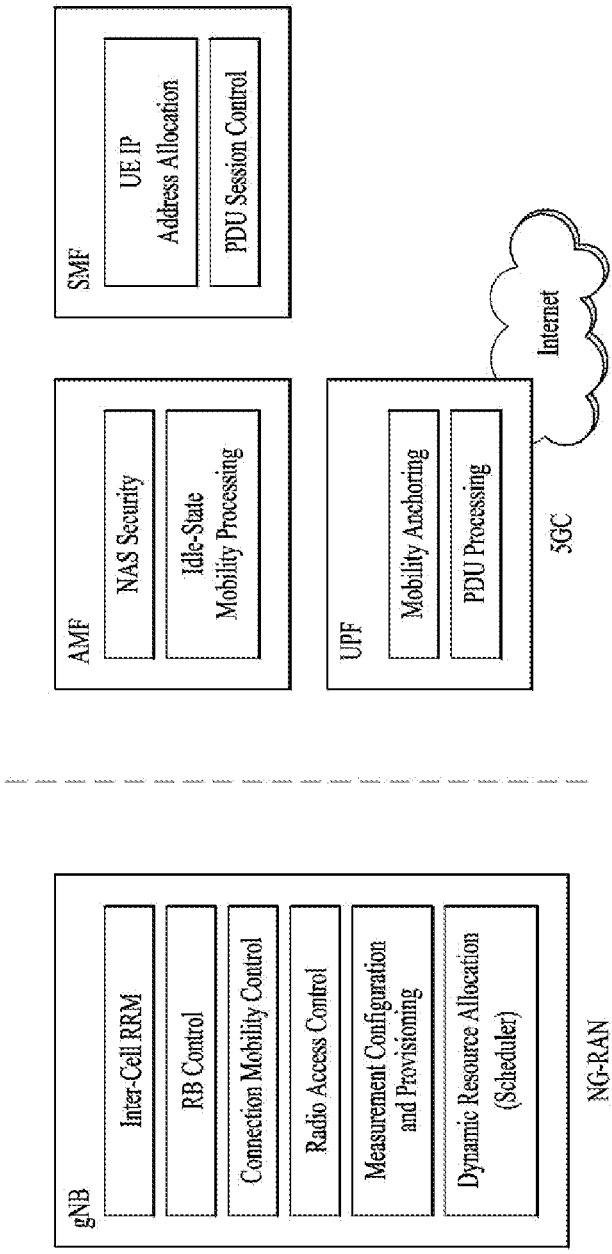
FIG. 5 is a diagram illustrating functional split between a next generation radio access network (NG-RAN) and a 5th generation core network (5GC) according to an embodiment of the present disclosure.

FIG. 5 illustrates functional split between the NG-RAN and the 5GC according to an embodiment of the present disclosure.

Referring to FIG. 5, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control FIG. 6 illustrates a radio frame structure in NR, to which embodiment(s) of the present disclosure is applicable.

Figure 6:
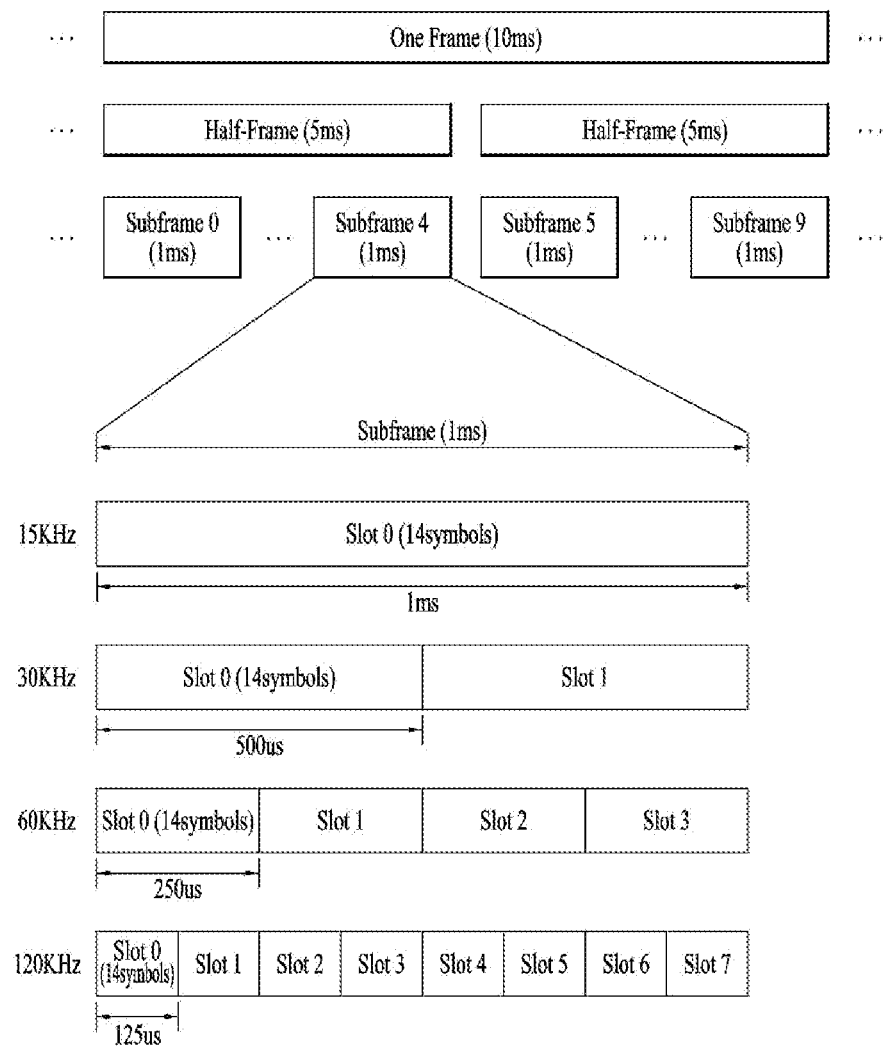
FIG. 6 is a diagram illustrating the structure of an NR radio frame to which embodiment(s) of the present disclosure is applicable.

Referring to FIG. 6, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame}_{slot}$, and the number of slots per subframe $N^{subframe,\mu}_{slot}$ according to an SCS configuration $\mu$ in the NCP case.

TABLE 1

| SCS (15*2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
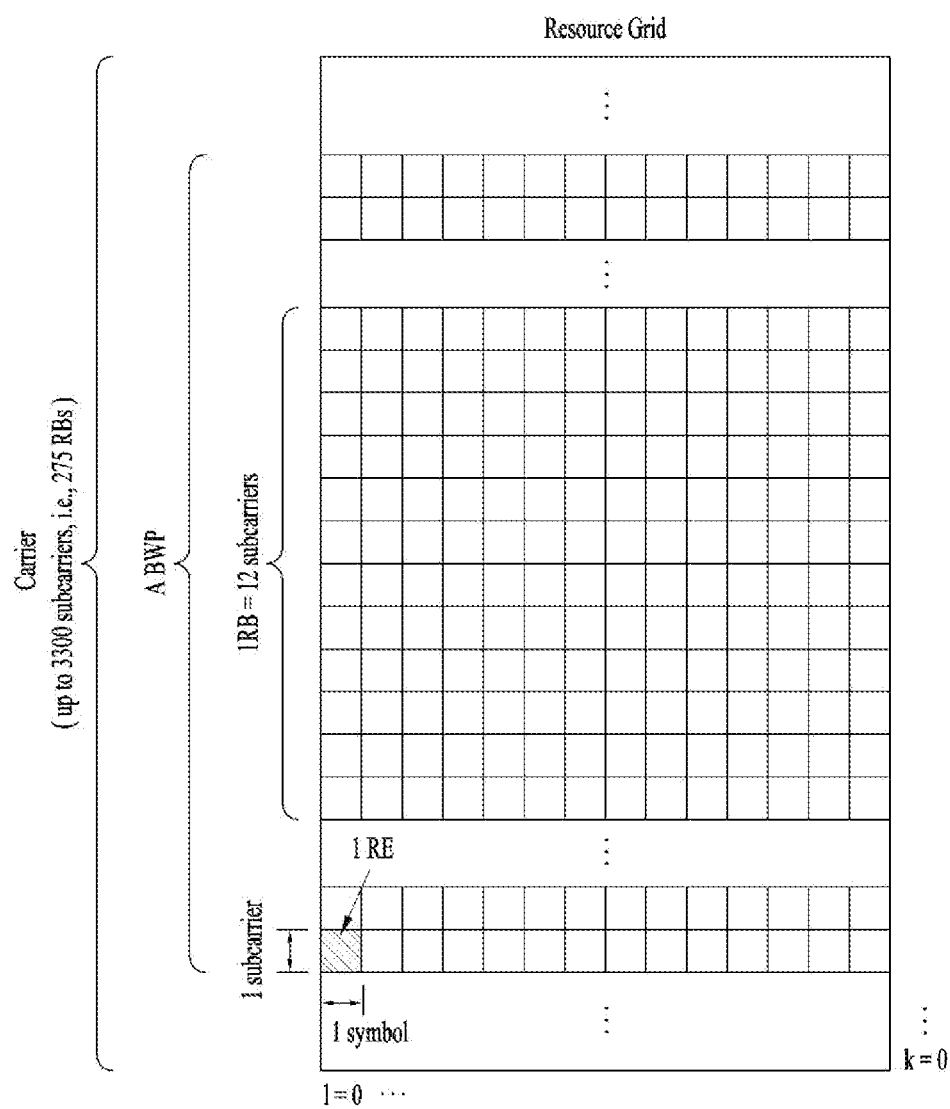
FIG. 7 is a diagram illustrating a slot structure in an NR frame according to an embodiment of the present disclosure.

FIG. 7 illustrates a slot structure in an NR frame according to an embodiment of the present disclosure.

Referring to FIG. 7, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

Figure 8:
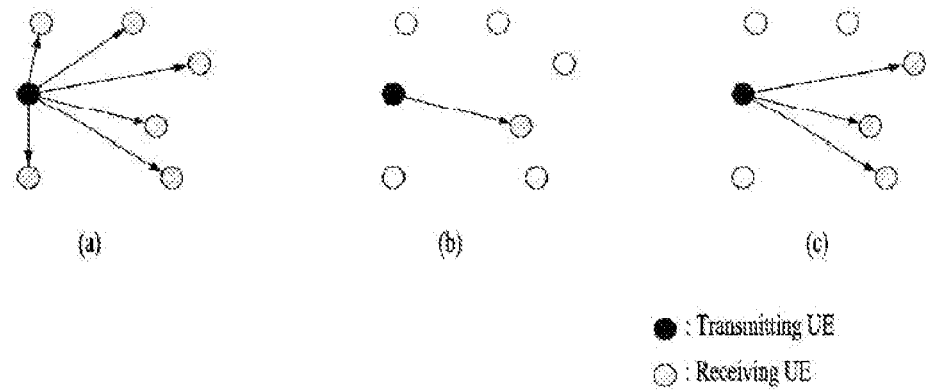
FIG. 8 is a diagram illustrating three kinds of cast types according to one embodiment of the present disclosure.

FIG. 8 illustrates three kinds of cast types according to one embodiment of the present disclosure.

Specifically, FIG. 8 (a) shows SL communication of a broadcast type, FIG. 8 (b) shows SL communication of a unicast type, and FIG. 8 (c) shows SL communication of a groupcast type. In case of SL communication of a unicast type, a UE may perform one-to-one communication with another UE. In case of SL communication of a groupcast, a UE may perform SL communication with one or more UEs in a group to which the UE belongs. According to various embodiments of the present disclosure, SL groupcast communication may be substituted with SL multicast communication, SL one-to-many communication, etc.

Hereinafter, Cooperative Awareness Message (CAM) and Decentralized Environmental Notification Message (DENM) will be described.

A CAM of a periodic message type, a DENM of an event triggered message type and the like may be transmitted in Vehicle-to-Vehicle (V2V) communication. The CAM may include basic vehicle information such as vehicle dynamic state information (e.g., direction and speed), vehicle static data (e.g., size), external lighting state, route history, etc. A size of the CAM may range 50 to 300 bytes. The CAM is broadcasted and latency should be smaller than 100 ms. The DENM may be a message created in case of unexpected situations such as vehicle failure, vehicle accident and the like. A size of the DENM may be smaller than 3,000 bytes, and all vehicles in a transmission range may receive the message. In doing so, the DENM may have a priority higher than that of the CAM.

Hereinafter, RRC connection establishment will be described.

For V2X or SL communication, a Tx UE may need to establish (PC5) RRC connection with a Rx UE. For example, a UE may obtain a V2X-specific SIB. With respect to a UE configured to perform V2X or SL communication by a higher layer and having data to transmit, if a frequency configured to transmit for SL communication is included in the V2X-specific SIB, the UE may establish RRC connection with another UE without including a Tx resource pool for the corresponding frequency. For example, if RRC connection is established between a Tx UE and a Rx UE, the Tx UE may perform unicast communication with the Rx UE over the established RRC connection.

Once the RRC connection is established between the UEs, the Tx UE may transmit an RRC message to the Rx UE.

Hereinafter, a Hybrid Automatic Repeat Request (HARQ) procedure will be described.

Error compensation scheme for securing communication reliability may include Forward Error Correction (FEC) scheme and Automatic Repeat Request (ARQ) scheme. In the FEC scheme, error at a Rx end can be corrected by adding a spare error correction code to information bits. The FEC scheme has a disadvantage in that system efficiency is lowered in a good channel environment despite having advantages in having small time latency and requiring no information exchanged separately between Tx and Rx ends. The ARQ scheme may raise transmission reliability but has a disadvantage in that system efficiency is lowered in a poor channel environment.

Hybrid Automatic Repeat Request (HARQ) scheme is the combination of FEC and ARQ and checks whether data received by a physical layer contains non-decodable error. If error occurs, retransmission is requested so that performance can be raised.

In case of SL unicast or groupcast, HARQ feedback and HARQ combining in a physical layer may be supported. For example, when a Rx UE operates in allocation mode 1 or allocation mode 2, the Rx UE may receive PSSCH from a Tx UE and transmit HARQ feedback for the PSSCH to the Tx UE using Sidelink Feedback Control Information (SFCI) format over Physical Sidelink Feedback Channel (PSFCH).

For example, SL HARQ feedback may be enabled for unicast. In this case, in a non-Code Block Group (non-CBG) operation, if a Rx UE decodes PSCCH targeting the Rx UE and successfully decodes a transport block related to the PSCCH, the Rx UE may generate HARQ-ACK. The Rx UE may then transmit the HARQ-ACK to a Tx UE. On the contrary, if a Rx UE fails in decoding a transport block related to PSCCH successfully after decoding the PSCCH targeting the Rx UE, the Rx UE may generate HARQ-NACK. The RX UE may then transmit the HARQ-NACK to a Tx UE.

For example, SL HARQ feedback may be enabled for groupcast. For example, in a non-CBG operation, two kinds of HARQ feedback options may be supported for groupcast.

(1) Groupcast option 1: After a Rx UE has decoded PSCCH that targets the RX UE, if the RX UE fails in decoding a transport block related to the PSCCH, the Rx UE may transmit HARQ-NACK to a Tx UE over PSFCH. On the contrary, after a Rx UE has decoded PSCCH that targets the RX UE, if the RX UE succeeds in decoding a transport block related to the PSCCH, the Rx UE may not transmit HARQ-ACK to a Tx UE.

(2) Groupcast option 2: After a Rx UE has decoded PSCCH that targets the RX UE, if the RX UE fails in decoding a transport block related to the PSCCH, the Rx UE may transmit HARQ-NACK to a Tx UE over PSFCH. After a Rx UE has decoded PSCCH that targets the RX UE, if the RX UE succeeds in decoding a transport block related to the PSCCH, the Rx UE may transmit HARQ-ACK to a Tx UE over PSFCH.

For example, if the group cast option 1 is used for SL HARQ feedback, all UEs performing groupcast communication may share a PSFCH resource. For example, each UE belonging to the same group may transmit HARQ feedback using the same PSFCH resource.

For example, if the groupcast option 2 is used for SL HARQ feedback, each UE performing groupcast communication may use a different PSFCH resource for HARQ feedback transmission. For example, each UE belonging to the same group may transmit HARQ feedback using a different PSFCH resource.

For example, when SL HARQ feedback is enabled for groupcast, a Rx UE may determine whether to transmit HARQ feedback to a Tx UE based on Transmission-Reception (Tx-Rx) distance and/or RSRP.

For example, in case of Tx-Rx distance based HARQ feedback in the groupcast option 1, if a Tx-Rx distance is equal to or smaller than a communication range requirement, a Rx UE may transmit HARQ feedback for PSSCH to a Tx UE. On the contrary, if the Tx-Rx distance is greater than the communication range requirement, the Rx UE may not transmit the HARQ feedback for PSSCH to the Tx UE. For example, the Tx UE may inform the Rx UE of a location of the Tx UE over SCU related to the PSSCH. For example, the SCI related to the PSSCH may be a second SCI. For example, the Rx UE may estimate or acquire the Tx-Rx distance based on a location of the Rx UE and a location of the Tx UE. For example, the Rx UE decodes an SCI related to PSSCH, thereby being aware of a communication range requirement used for the PSSCH.

For example, in case of resource allocation mode 1, a time between PSFCH and PSSCH may be configured or preconfigured. In case of unicast or groupcast, if retransmission in SL is necessary, indication of this may be sent to a BS by a UE in a coverage that uses PUCCH. A Tx UE may transmit indication to a serving BS of the Tx UE in form of Scheduling Request/Buffer Status Report (SR/BSR) instead of HARQ ACK/NACK. Although the BS does not receive the indication, the BS may schedule an SL retransmission resource for the UE. For example, in case of resource allocation mode 2, a time between PSFCH and PSSCH may be configured or preconfigured.

For example, from the perspective of transmission of a UE on a carrier, TDM between PSCCH/PSSCH and PSFCH may be allowed for a PSFCH format for SL in a slot. For example, a sequence-based PSFCH format having a single symbol may be supported. Here, the single symbol may not be an AGC interval. For example, the sequence-based PSFCH format may apply to unicast and groupcast.

For example, in a slot associated with a resource pool, a PSFCH resource may be configured or preconfigured periodically as N slot intervals. For example, N may be set to a value equal to or greater than 1. For example, N my include 1, 2 or 4. For example, HARQ feedback for transmission in a specific resource pool may be transmitted over PSFCH on the specific resource pool only.

For example, in case that a Tx UE transmits PSSCH to a Rx UE across slot #X to slot #N, the Rx UE may transmit HARQ feedback for the PSSCH to the Tx UE in slot #(N+A). For example, the slot #(N+A) may include a PSFCH resource. Here, for example, A may include a smallest integer equal to or greater than K. For example, K may be the number of logical slots. IN this case, K may be the number of slots in a resource pool. Or, for example, K may be the number of physical slots. In this case, K may be the number of slots inside or outside a resource pool.

For example, when a Tx UE transmits HARQ feedback on a PSFCH resource in response to one PSSCH transmitted to the Rx UE by a Tx UE, the Rx UE may determine a frequency domain and/or a code domain of the PSFCH resource based on implicit mechanism within a configured resource pool. For example, based on at least one of s slot index related to PSCCH/PSSCH/PSFCH, a subchannel related to PSCCH/PSSCH, and/or an identifier for identifying each Rx UE in a group for groupcast option 2 based HARQ feedback, a Rx UE may determine a frequency domain and/or a code domain of a PSFCH resource. And/or, for example, based on at least one of SL RSRP, SINR, L1 source ID, and/or location information, a Rx UE may determine a frequency domain and/or a code domain of a PSFCH resource.

For example, in case that HARQ feedback transmission over PSFCH of a UE and HARQ feedback reception over PSFCH overlap with each other, the UE may select one of the HARQ feedback transmission over PSFCH and the HARQ feedback reception over PSFCH based on a priority rule. For example, the priority rule may be based on a minimum priority indication of the related PSCCH/PSSCH.

For example, in case that HARQ feedback transmission of a UE over PSFCH for a plurality of UEs overlap with each other, the UE may select a specific HARQ feedback transmission based on a priority rule. For example, the priority rule may be based on a minimum priority indication of the related PSCCH/PSSCH.

Hereinafter, Intelligent Transport Systems (ITS) will be described.

ITS is the system that automates the operation and management of transportation systems and improves transportation efficiency and safety by providing traffic information and services by combining advanced technologies with transportation and transportation facilities. For example, a high pass system that we use to drive a vehicle, a bus arrival guidance system that we use to ride public transportation, and real-time signal control according to traffic conditions may correspond to ITS. The conventional ITS has been mainly applied to a traffic management-oriented system that provides information to vehicles in one direction.

With the development of technology, traffic safety-oriented Cooperative-ITS (C-ITS) has developed, which enables rapid and active response and prevention of unexpected situations by continuously and interactively sharing data between vehicles and between vehicles and infrastructure. C-ITS is a system that prevents traffic accidents by checking or warning dangerous information such as surrounding traffic conditions, sudden stops, and falling objects in real time while a vehicle communicates with infrastructure installed on other vehicles or roads during driving.

Hereinafter, vehicle communication for Intelligent Transport System (ITS) will be described.

Intelligent Transport System (ITS) that utilizes V2X may mainly include an access layer, a network & transport layer, a facilities layer, an application layer, an entity for security and management, etc.

Vehicle communication may apply to various scenarios such as vehicle-to-vehicle communication (V2V), vehicle-to-BS communication (V2N, N2V), vehicle-to-RSU (Road Side Unit) communication (I2I), vehicle-to-person communication (V2P, P2V), RSU-to-person communication (I2Pm P2I), etc. Vehicle, BS, RSU, person or the like, which becomes a subject of vehicle communication, is referred to as an ITS station.

Hereinafter, an ITS reference architecture will be described.

Figure 9:
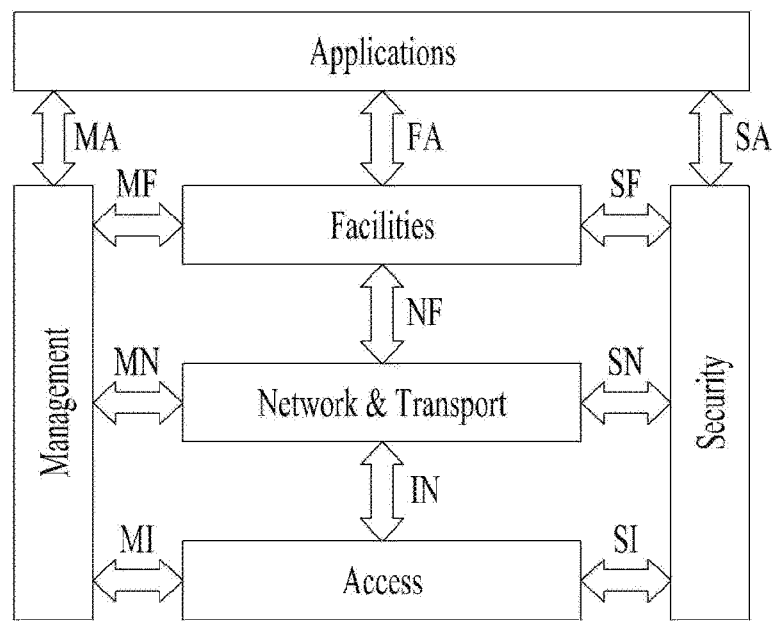
FIG. 9 is a diagram illustrating an ITS reference architecture according to one embodiment of the present disclosure.

FIG. 9 shows an ITS reference architecture according to one embodiment of the present disclosure.

Referring to FIG. 9, as an ITS station reference architecture defined in ISO 21217/EN 302 665, FIG. 9 includes an access layer, a network & transport layer, a facilities layer, entities for security and management, and an application layer at the top, and basically follows a layered OSI model.

Features of an ITS station reference architecture based on an OSI model are described as follows. An access layer of an ITS station corresponds to an OSI layer 1 (physical layer) and an OSI layer 2 (data connection layer), a network & transport layer of the ITS station corresponds to an OSI layer 3 (network layer) and an OSI layer 4 (transport layer), and a facilities layer of the ITS station corresponds to an OSI layer 6 (session layer), an OSI layer 6 (presentation layer) and an OSI layer 7 (application layer).

An application layer located at the top position of the ITS station performs a function of actually implementing and supporting a use-case, and may be selectively usable depending on the use-case. A management entity plays a role in managing all layers as well as communication and operation of the ITS station. A security entity provides a security service for all layers. The respective layers of the ITS station exchange data to transmit/receive or additional informations for various purposes by vehicle communication over mutual interfaces.

Figure 10:
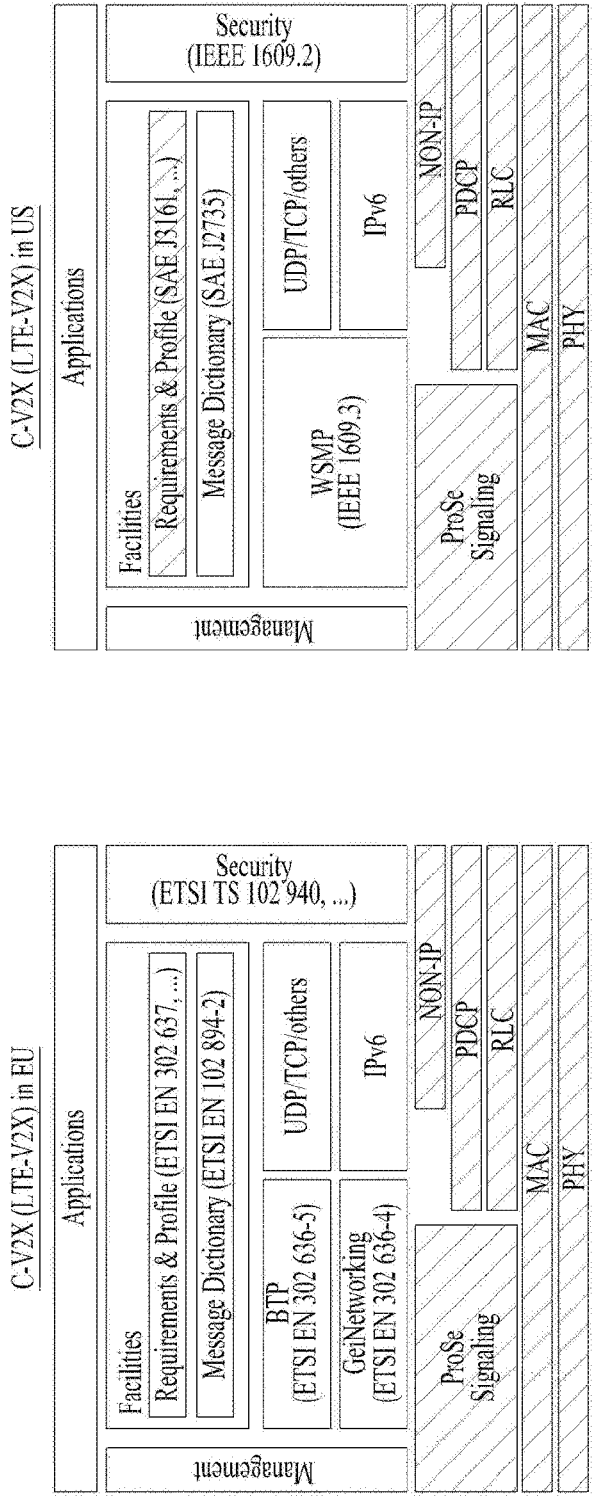
FIG. 10 is a diagram illustrating an architecture of an ITS station according to one embodiment of the present disclosure.

FIG. 10 illustrates an architecture of an ITS station according to one embodiment of the present disclosure.

FIG. 10 illustrates an ITS station architecture designed to be applicable based on the ITS station reference architecture described with reference to FIG. 9.

Regarding the main concept of the architecture shown in FIG. 9, between two terminal vehicles/users configured with a communication network, communication processing can be divided per layer with a special function owned by each layer. Namely, if a V2V message is created, data is transferred in a manner of passing through each layer downward in a vehicle and ITS system (or other ITS related terminal/system). On the other side, when a message arrives, data is transferred in a manner of passing through each layer upward in a message-receiving vehicle or ITS (or other ITS related terminal/system).

The ITS system through vehicle communication and network is organically designed in consideration of various access technologies, network protocols, and communication interfaces to support various use-case support, and the roles and functions of each layer described below may vary depending on a situation. The following briefly describes the functions of a facilities layer.

A facilities layer plays a role in supporting to effectively implement various use-cases defined in an application layer above, and performs application support, information support, and session/communication support for example.

Figure 11:
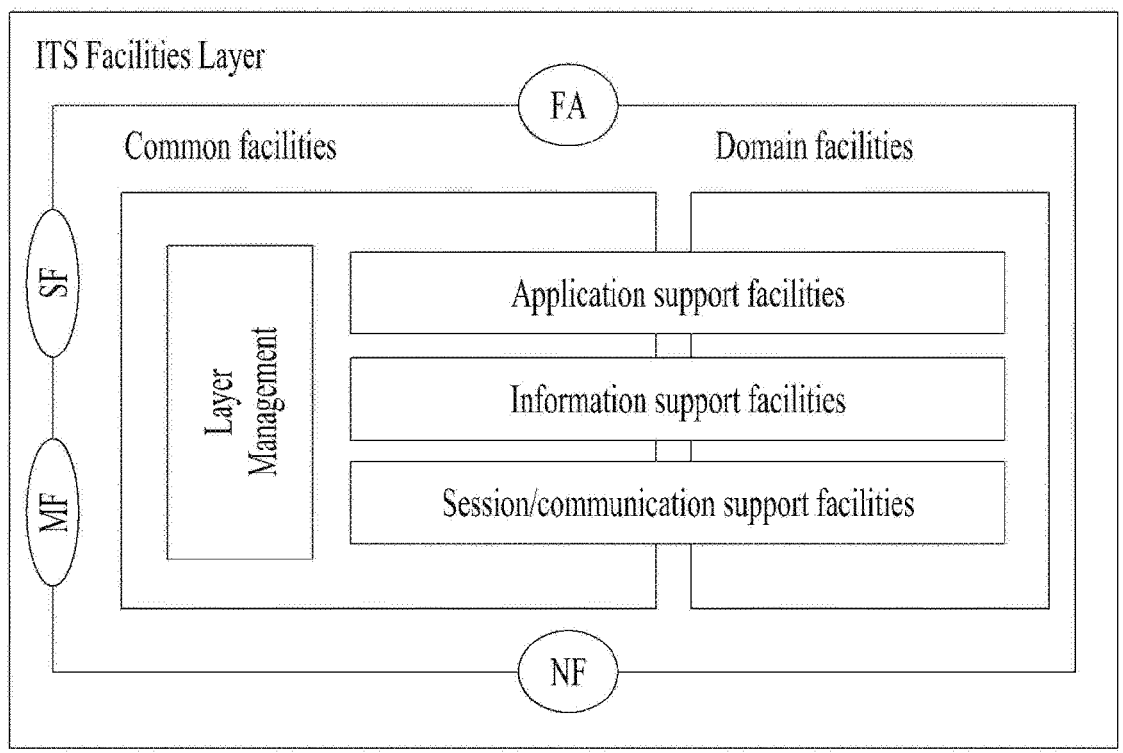
FIG. 11 is a diagram illustrating an architecture of a facilities layer according to one embodiment of the present disclosure.

FIG. 11 illustrates an architecture of a facilities layer according to one embodiment of the present disclosure.

A facilities layer basically supports functions of three upper layers (e.g., session layer, presentation layer, application layer) of an OSI model. Specifically, for ITS, as shown in FIG. 11, facilities such as application support, information support, session/communication support and the like are provided. Here, a facility means a component that provides functionality, information and data.

Application support facilities: As facilities supporting operations (mainly, message creation for ITS, transmission/reception with a lower layer, and management thereof) of ITS applications, there are CA (Cooperative Awareness) basic service, DEN (Decentralized Environmental Notification) basic service, and the like. In the future, facility entities and related messages for new services such as CACC (Cooperative Adaptive Cruise Control), Platooning, VRU (Vulnerable Roadside User), CPS (Collective Perception Service) and the like may be additionally defined.

Information support facilities: As facilities that provide common data information or database that will be used by various ITS applications, there are Local Dynamic Map (LDM) and the like.

Session/communication support facilities: as facilities that provide services for communication and session management, there are an addressing mode, a session support and the like.

Moreover, facilities may be classified into common facilities and domain facilities.

Common facilities: As facilities that provide common services or functions necessary for various ITS applications and ITS station operations, there are time management, location management, service management, etc.

Domain facilities: As facilities that provide special services or function necessary for some (a single or plurality of) ITS applications only, there are a DEN basic service for Road Hazard Warning (RHW) applications and the like for example. The domain facilities are optional functions and are not used unless supported by an ITS station.

A role in managing and servicing Information related to management and security of a layer management facilities layer is performed, and the related information is bidirectionally delivered and shared over MF (interface between management entity and facilities layer) and SF (interface between security entity and facilities layer) (or MF-SAP, SF-SAP). A request from an application layer to a facilities layer or a transfer of a service message and related information to the application layer from the facilities layer is performed over FA (or FA-SAP), and a transfer of bidirectional service message and related information between a facilities layer and a lower network & transport layer is performed via NF (interface between the network & transport layer and the facilities layer, or NF-SAP).

Embodiment

In the conventional Day 1 technology, safety support services mainly focused on V2V were supported. Recently, in Day 2, services using infrastructure have been added, and services that provide user convenience as well as safety are being developed. However, even Day2 technology is limited to I2V services, and is limited to broadcasting preconfigured safety alarm information to vehicles. The construction site guidance technology developed in Day2 is only a simple service in which preconfigured construction site information (e.g., construction name, construction period, construction area, or construction site characteristics) is delivered to a vehicle via a V2X device installed around the construction site. In this case, not only is there a disadvantage of not accurately expressing the construction site area, but it is also difficult to respond to a flexibly changing construction site area such as road lane painting.

When occupying, constructing, and working on an existing road actually, a vehicle is guided to slow down through information boards such as rubber cones and standing signs for the safety of vehicles driving around. With the recent development of V2X technology, devices and standards have been developed that allow vehicles equipped with V2X receivers to acquire construction site information in advance even from long distances. To this end, the location and duration of the construction site are predefined and set, and then construction site information is inserted and transmitted in messages such as Cooperative Awareness Message (CAM) or Basic Safety Message (BSM) from a V2X device.

Figure 12:
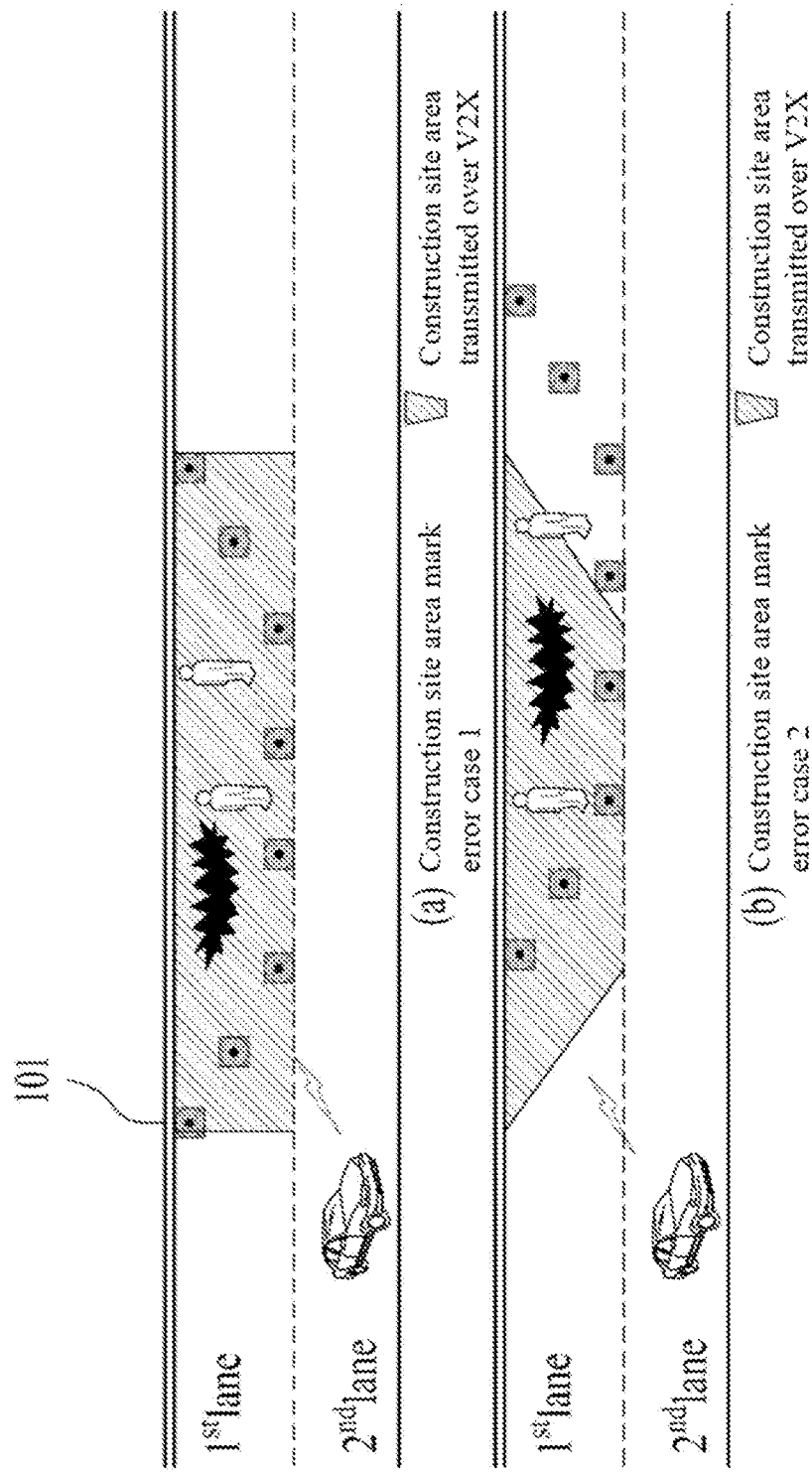

FIG. 12 is a diagram to describe a general construction site information transmitting method.

Referring to FIG. 12, rubber cones 101 marking a construction site area and the like may be installed along a construction site perimeter for safety of vehicles. In addition, the rubber cone may operate as a Road Side Unit (RSU) capable of performing V2X communication with surrounding vehicles in a manner of being equipped with a communication system. Generally, an RSU may transmit construction site information including location or period information of a construction site to surrounding vehicles over a message such as CAM, BSM, etc. Since such construction site information is predefined and set, even if a location of an RSU is changed due to a change of an actual construction site area, the RSU may transmit only the initially set construction site information to surrounding vehicles.

Referring to FIG. 12 (a), generally, the conventional construction site information may be marked in unit of lane. Yet, since an actual construction site area corresponds not to a lane unit but to a partial area of a lane, it may cause a problem that the actual construction site area fails to accurately match a construction site area included in construction site information.

Referring to FIG. 12 (b), generally, the conventional construction site information is set in a manner of predefining location and period of a construction site and the like. Hence, in case of working along a road for road lane painting and the like, as time goes by, it may cause a problem that an actual location of a construction site is misaligned with a location in construction site information transmitted over V2X. Thus, the conventional construction site information transmitting method may cause a problem that an accurate location of a construction site is not marked in real time.

To solve such a problem, a method for an RSU to share a setting message and an event message with another RSU using I2I communication is proposed. Accordingly, an RSU may acquire information on a construction site area in real time and then acquire information on danger occurring in the construction site area. Yet, for such a technology, the RSU should be equipped with a GPS function for location measurement and a high-functional processor. Since a multitude of RSU devices should be installed in a whole construction site area, costs may increase. Hence, a system capable of reducing installation costs by minimizing a structure of an RSU and enabling integrated management of a plurality of RUSs is required.

As described above, in order to guide a construction site area that changes in real-time more accurately, instead of preconfiguring information on the construction site area, a construction site area is automatically configured in real time using I2I communication of V2X devices or RSUs. In an initial installation operation, construction site area configuration is performed using I2I communication with V2X devices. To this end, all V2X devices acquire location informations of their own and share them with each other. Hence, all V2X devices should be equipped with GPS receivers and also equipped with user interfaces for settings, respectively. To implement this, manufacturing costs of the V2X devices increase. As a number of construction site guidance devices (e.g., RSUs) are necessary for a construction site area, device simplification is required.

In the present disclosure, a method of simplifying one or more RSUs installed in a construction site area is proposed, and a structure of a dedicated auxiliary device (e.g., a handheld device: a smartphone) to support the same and a cooperative communication scheme of the two devices are described.

[Construction Site Guidance System]

Figure 13:
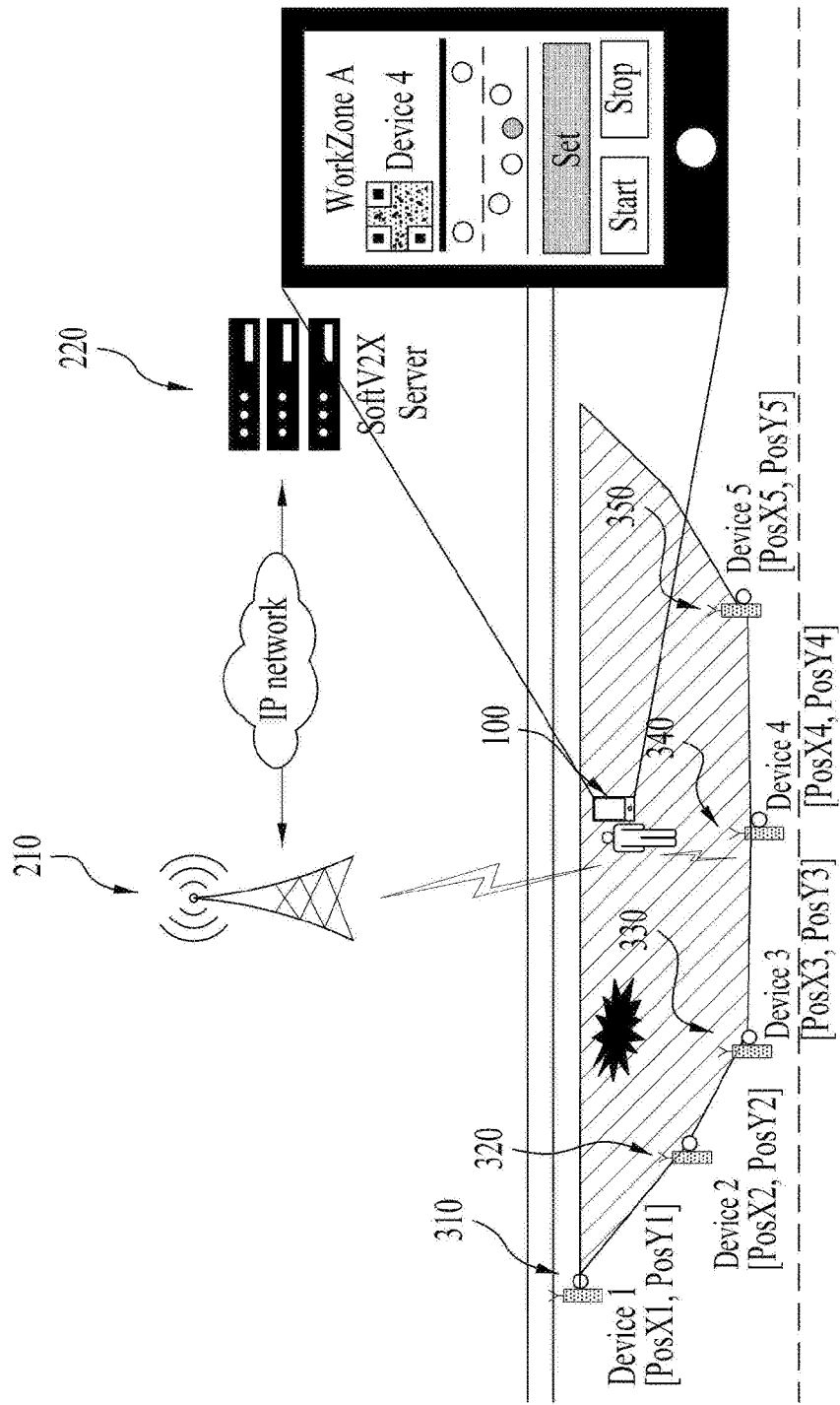

FIG. 13 is a diagram to describe a construction site guidance system according to embodiment(s) of the present specification.

Referring to FIG. 13, a construction site guidance system may include a dedicated auxiliary device 100, a Base Station (BS) 210, a soft V2X server 220, construction site guidance devices 310, 320, 330, 340 and 350, etc.

The construction site guidance devices 310, 320, 330, 340 and 350 may be installed along a construction site area perimeter. The construction site guidance devices may generate information on a construction site area by sharing locations with each other. The construction site guidance device is equipped with a shock detection sensor, thereby detecting accident occurrence. The construction site guidance device may provide a service of transmitting construction site related information to surrounding vehicles. In order to provide an accurate construction site guidance service by measuring a construction site area in real time, each of the construction site guidance devices should acquire a location of its own and then share it with other construction site guidance devices. To this end, in case of installing a GPS device at each construction site guidance device, it may be disadvantageous in that installation costs increase. Therefore, in the present specification, a structure of a construction site guidance device is simplified, thereby reducing costs and facilitating installation. In the following description, the construction site guidance device may be described using terms such as a V2X device, an RSU, an infrastructure, a device, etc.

The dedicated auxiliary device 100 is a device for assisting and managing a simplified construction site guidance device. The dedicated auxiliary device may be implemented using an application installed in a mobile phone and the like. A user or construction worker may transmit a location of each construction site guidance device to each construction site guidance device using the dedicated auxiliary device. In the following description, the dedicated auxiliary device may be described using terms such as a dedicated device, a management auxiliary device, an auxiliary device, a mobile device, a user equipment, etc.

The BS 210 may perform Uu communication with the dedicated auxiliary device. In addition, the soft V2X server may receive construction site related information from the BS and provide a construction site guidance service.

FIG. 13 illustrates a method of installing a constructing site guidance device by a construction worker. In installing the construction site guidance devices 310, 320, 330, 340 and 350 (i.e., devices 1 to 5) equipped with the simplified V2X devices respectively, the construction worker may use the dedicated auxiliary device. For example, when the construction worker installs the construction site guidance device 340 (i.e., device 4), the construction worker may recognize a QR code of the construction site guidance device 340 (i.e., device 4) via a camera using the dedicated auxiliary device. And, the dedicated auxiliary device may transmit GPS location information and construction site common information acquired using a GNSS receiver to the construction site guidance device 340 (device 4). The construction site common information may include information received in advance by the soft V2X server 220 via the BS 210 of the existing cellular network, or information such as a construction period, a type and the like. Subsequently, the construction worker may input a set button on a screen of the dedicated auxiliary device, thereby setting the device 4 to a set mode. The construction worker may progress the configuration of all the construction site guidance devices in the same manner.

Figure 14:
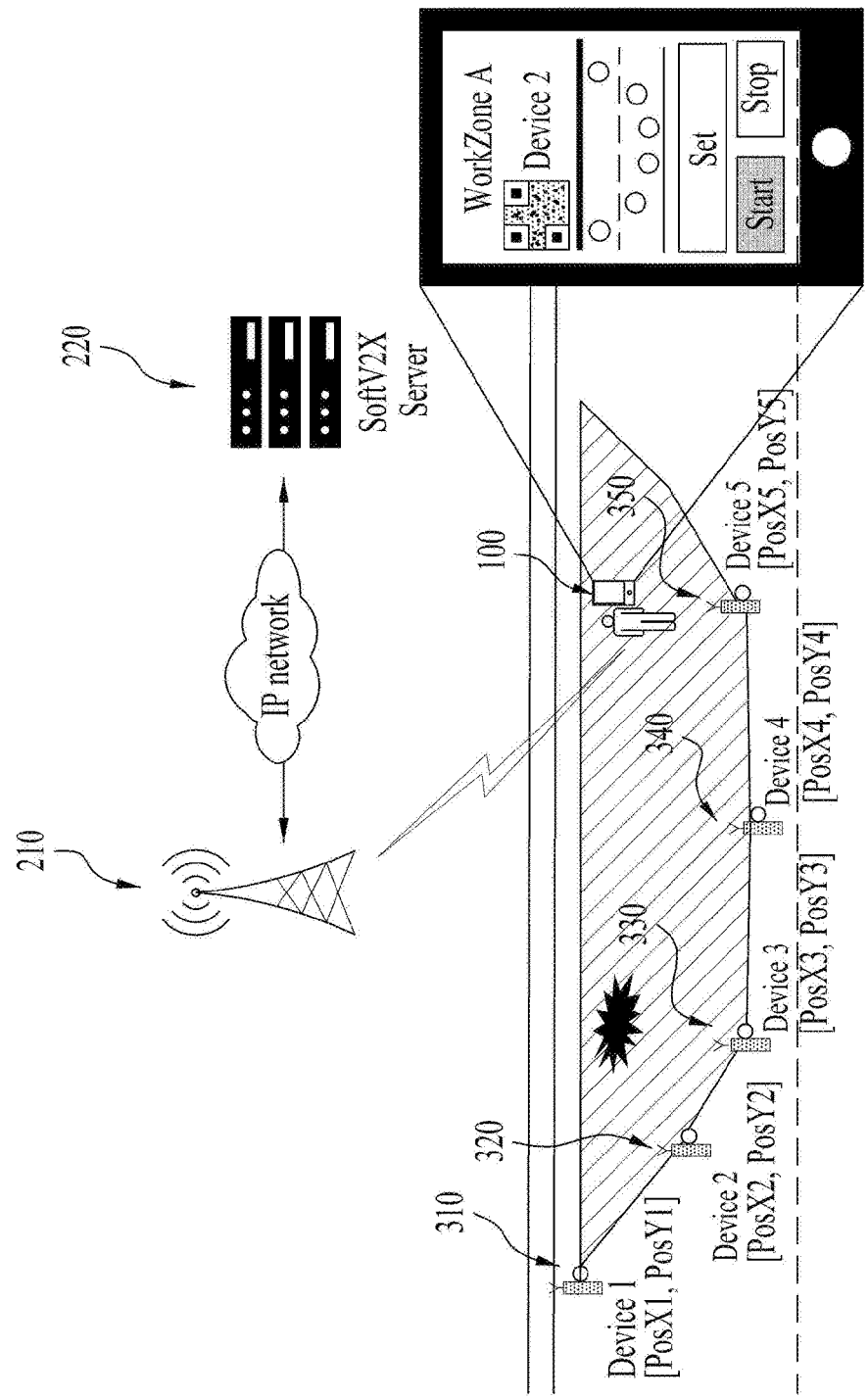

FIG. 14 is a diagram to describe a method of starting a construction site guidance system after completion of installation of construction site guidance devices according to embodiment(s) of the present specification.

After completing the installation of the respective construction site guidance devices, a construction worker may start a construction site guidance system suing a dedicated auxiliary device. For example, if a construction worker inputs a start button of a dedicated auxiliary device, the dedicated auxiliary device transmits construction site area information together with setting information indicating a start to a surrounding device over PC5 communication using measured location information of all devices. The construction site area information may include a location list of each construction site guidance device. In addition, final construction site area information is transmitted to a BS using a UU interface modem installed on the dedicated auxiliary device, whereby a corresponding signal may be forwarded to a construction site collective center, a traffic guidance system, or a V2X server.

Figure 15:
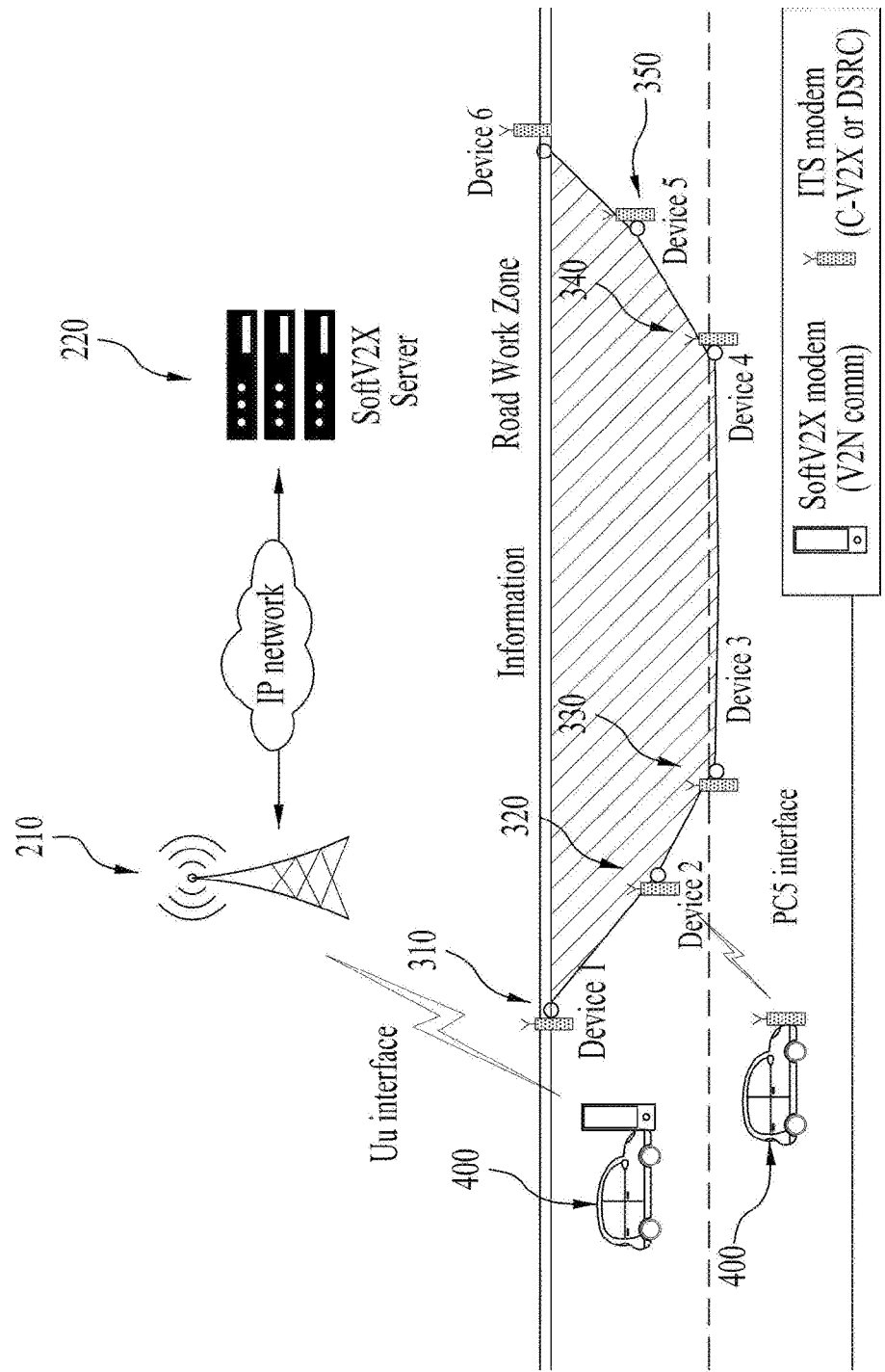

FIG. 15 illustrates a construction site guidance system according to embodiment(s) of the present specification.

Once settings are complete, accurate construction site area information may be acquired based on construction site guidance devices actually installed at a construction site boundary. The construction site guidance devices 310, 320, 330, 340 and 350 may share a position list (PositionList) using I2I communication that uses direct communication. A dedicated auxiliary device may upload the position list to a V2X server 220 over a Uu interface. Therefore, the construction site guidance device, the dedicated auxiliary device and the soft V2X server may acquire real-time construction site area information. The construction site guidance devices 310, 320, 330, 340 and 350 may forward the corresponding information to a surrounding ITS-vehicle 400 over I2V communication, and the soft V2X server 220 may forward the construction site information to a soft V2X vehicle, thereby providing driver's safety.

[Message Protocol]

Figure 16:
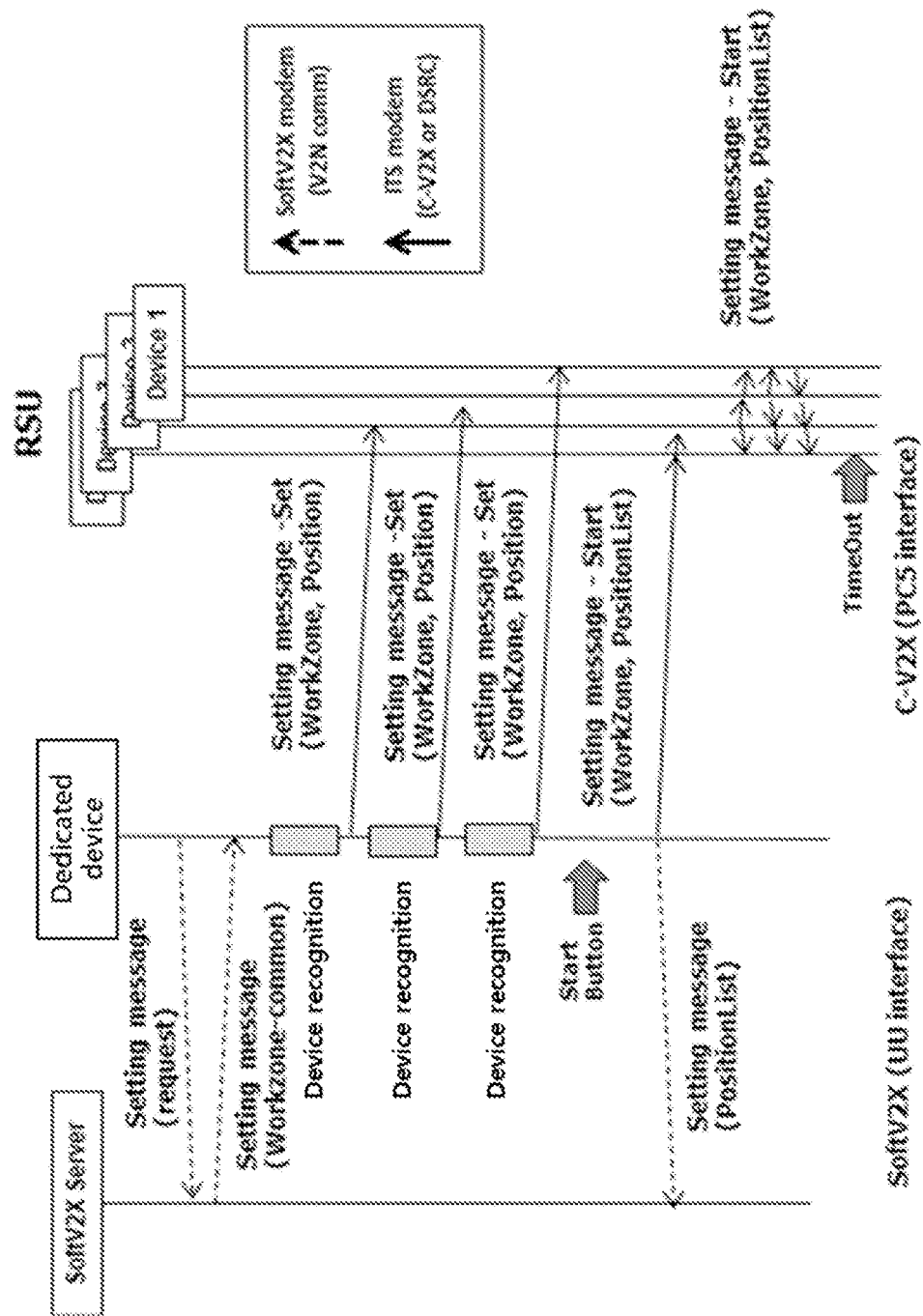

FIG. 16 is a diagram to describe a protocol indicating a per-device message forwarding method on initial configuration.

When a construction site guidance device is installed, overall construction site information is configured via a dedicated auxiliary device. If there is a soft V2X server that controls a construction site guidance system, the dedicated auxiliary device may make a request for construction site basic information to the soft V2X server by UL communication of a UU interface. Thereafter, the soft V2X server informs the corresponding dedicated auxiliary device of the construction site basic information by DL communication of the UU interface via a BS.

Subsequently, construction site guidance devices are installed one by one using the dedicated auxiliary device. The dedicated auxiliary device acquires unique information of the construction site guidance device (RSU) via an external input device (e.g., a camera, a barcode input device, a serial number input, etc.) and indicates its location by forwarding location information of the construction site guidance device acquired using a GNSS device to the corresponding device. Besides, preconfigured construction site basic information is transmitted as well so as to be used in configuring a message that will be used later for a service. In doing so, for this communication, a direct communication device provided to the dedicated auxiliary device is used. A construction site manager may install all the construction site guidance devices on the construction site boundary in the same manner.

So to speak, the dedicated auxiliary device may make a request for construction site common information to the soft V2X server and then receive it. The construction site common information may mean construction site related information such as a construction type, a construction period, an area and the like. The soft V2X server may include a server configured to manage a construction site management system overall and communicate with a dedicated auxiliary device or vehicles via a BS.

A construction worker (or a user) may install each construction site guidance device at a desired location, acquire a location of each construction site guidance device using the dedicated auxiliary device, and transmit it to each construction site guidance device. In doing so, the dedicated auxiliary device may transmit the construction site common information received from the V2X server together with the location of the construction site guidance device.

If the construction worker (or user) presses a start button of the dedicated auxiliary device, a position list of all the construction site guidance devices to each construction site guidance device and/or the soft V2X server. Having received the position list, the construction site guidance device may transmit the position list to other construction site guidance devices using I2I communication. In doing so, as time-out is set, the construction site guidance devices may transmit the position lists to each other until the time-out period expires.

Figure 17:
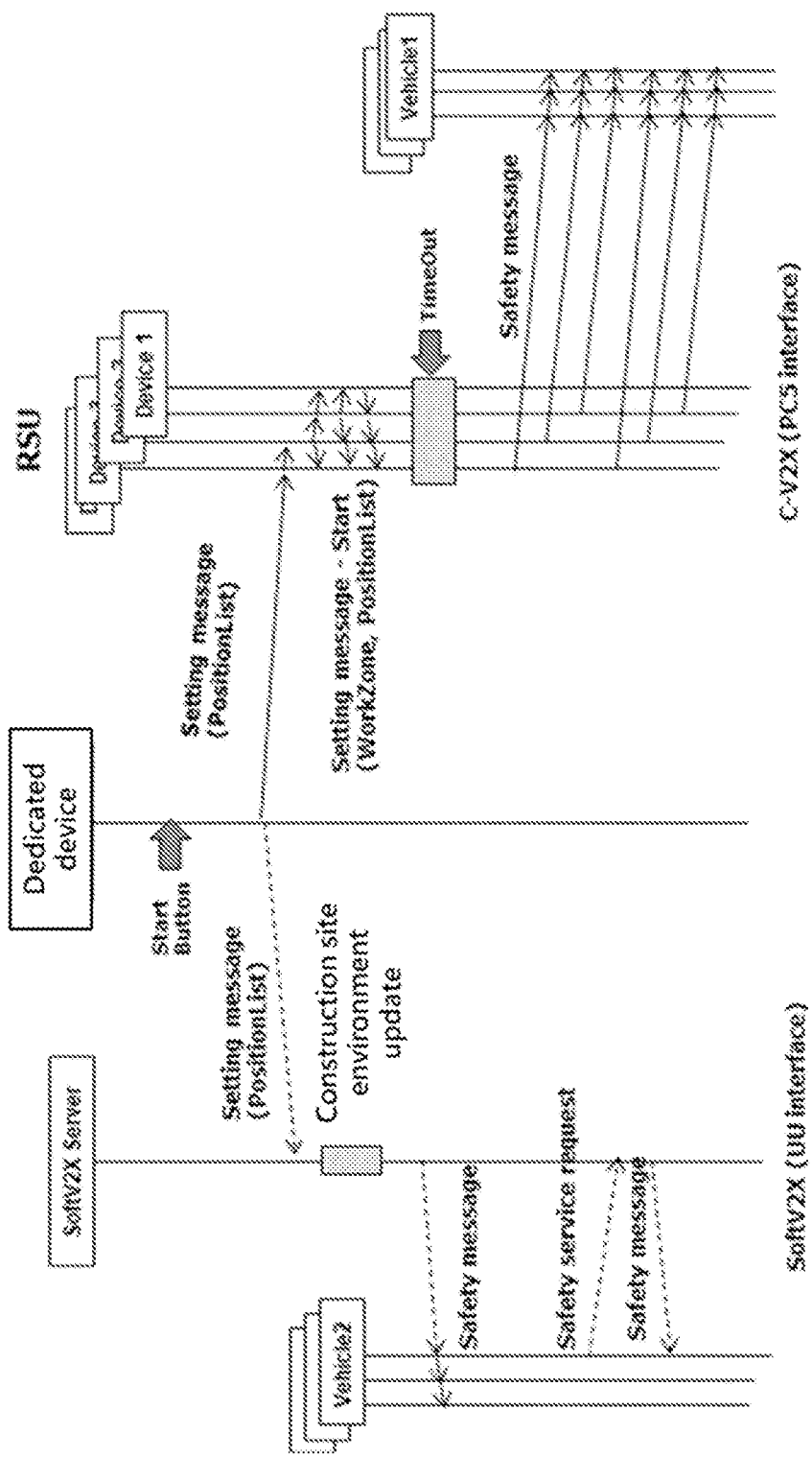

FIG. 17 is a diagram to describe an operation after inputting a start button of a dedicated auxiliary device.

Once all settings are complete, an entire system may be driven via a start button of a dedicated auxiliary device. In this case, the dedicated auxiliary device displays a construction site area using location information collected from all construction site guidance devices and forwards this information to surrounding construction site guidance devices, whereby all the construction site guidance devices services the whole construction site area. The respective devices share a position list (PositionList) value over I2I communication that uses PC5 interface overall. After elapse of a predetermined time (on time-out occurrence), each of the devices may provide a safety service to vehicles currently travelling around. Besides, the dedicated auxiliary device uploads the position list (PositionList) value via a uu interface. Through this, a network also receives the construction site area measured in real time and may directly provide a construction site guidance service to a vehicle over DL communication of UU interface using the received construction site area.

Once configuration is complete using a dedicated device, a soft V2X server and construction site guidance devices (RSUs) may provide a construction site guidance service to a vehicle travelling around using communication systems of their own, respectively. The construction site guidance devices (RSUs) may transmit safety messages to surrounding vehicles by broadcast using C-V2X PC5 communication or DSRC communication. Meanwhile, if acquiring a position list, the soft V2X server may provide a construction site guidance service using construction site information (Workzone info.) and RSU installation information (PositionList) of the related art. Owing to the Uu interface characteristics, the safety message may be provided to all subscribers by broadcast or provided by unicast in response to a request (e.g., a safety service request message) made by a vehicle.

So to speak, if a start button is inputted, a dedicated auxiliary device may transmit a position list of a construction site guidance device to surrounding construction site guidance devices. Each of the construction site guidance devices may transmit a position list to the surrounding construction site guidance devices using I2I communication until a time-out period expires. Once the time-out period expires, each of the construction site guidance devices may transmit a safety message to surrounding vehicles using I2V communication. The safety message may contain construction site common information, construction site area information (e.g., position list) and the like. If the start button is inputted, the dedicated auxiliary device may transmit the position list of the construction site guidance device to a soft V2X server via a BS. Having received the position list, the soft V2X server may acquire information on a construction site area that changes in real time. Then, the soft V2X server may transmit a safety message to vehicles via the BS.

FIG. 18 illustrates a message structure according to embodiment(s) of the present specification.

Referring to FIG. 18, a structure of a message used in a facilities layer to achieve a communication protocol is illustrated.

FIG. 18 (a) shows a message used for initial settings by a dedicated auxiliary device, which may include a header, a construction site area container (Workzone Container), a setting container, and an event container. FIG. 18 (b) shows a configuration of a message used for initial settings by a dedicated auxiliary device. A message may be defined as a sequence and include a header, a construction site area (work zone) container, a setting container, and an event container, in which the setting container and the event container may be optional.

FIG. 19 illustrates each message configuration.

FIG. 19 (a) shows the configuration of a construction site area container (Workzone Container). The construction site area container is defined as a sequence and may include a construction site ID (Workzone ID), a construction site type (workzoneType), a construction period start (workPeriodStart), a construction period end (workPeriodEnd), a construction site level (workzoneLevel). The construction site ID is defined as an integer (16 bits) and may give a unique value to a construction site by being set to a random value. The corresponding value is used for construction site management such as operation, accident management and the like, and construction site guidance devices (e.g., RSUs) installed at the corresponding construction site may have the ID of the same value.

FIG. 19 (b) shows the configuration of a construction site type. A construction site type (WorkzoneType) may be defined as DE_workzoneType. The DE_workzoneType may be defined as an integer, and a status of a value may be set to match each figure. For example, if a value of the integer is 0, it means a status of 'unknown'. '1' may mean 'road pavement in progress', '2' may mean 'road painting in progress', '3' may mean 'road cleaning in progress', and '4' may mean 'road repair in progress'. To indicate a period of a road work, a work start time and a work end time may be represented through 'construction period start (workPeriodStart)' and 'construction period end (workPeriodEnd)', respectively. A construction site level (WorkZoneLevel) represents a road state as an integer (1~10). Depending on lightness and heaviness of the state, if the state is light, the level may be set to 1. If the state is heavy, the level may be set to 10.

The construction period start (WorkPeriodStart) and the construction period end (WorkPeriodEnd) may indicate a construction start time and a construction end time, respectively. A data type uses DE_TimeStampIts of SAE J2735. To indicate a danger level of a construction site, lightness and heaviness is represented 1 to 5 using construction site levels (WorkZoneLevel) configured with integers. The higher a figure gets, the more a danger level increases. If the danger level is '0', it is defined as Unknown. Finally, a value of a position list (PositionList) used for the real-time construction site measurement proposed in the present specification is represented through a 'WorkZonePosition' field.

FIG. 19 (c) shows the configuration of a setting container. The setting container (SettingContainer) is a message container used for infrastructure configuration over I2I communication. The setting container may include a setting type (SettingType), a time-out value (TimeOutValue), and a data value used for settings. Data used in the present specification may include a point position (PointPosition) and a point position list (PointPositionList) to represent a construction site accurately. The setting type (SettingType) is a control signal indicating a prescribed setting state and may be defined as an integer (4 bits, 1~16). For example, a case of '1' means a set state, a case of '2' means a start state, and a case of '3' means an end state. The time-out value (TimeOutValue) may mean a value that defines a corresponding time-out time and haves an integer value (16 bits, 1~65536), and its unit may be a second (sec). For example, if a time-out value is set to 10, it may mean that time-out will be executed in 10 seconds. The point position is a field for defining a location of an infrastructure itself and may use the conventional format of DF_ReferencePosition [1]. The point position list may include data of collection of point positions of surrounding devices. The point position list may be represented as a sequence, and have a value of maximum 100. Each data may have the DE_Position format like the point position.

For example, of a setting type of a setting container indicates a setting mode, the setting container may include location information of a construction site guidance device, i.e., a point position (PointPosition). If a setting type of a setting container indicates a start mode, the setting container may include a position list resulting from collecting location informations of construction site guidance devices, i.e., a point position list (PointPositionList).

FIG. 20 shows message structures for soft V2X communication.

FIG. 20 (a) and FIG. 20 (b) show message configurations used in a facilities layer for soft V2X communication. A soft V2X server may communicate with a dedicated auxiliary device for initial configuration and then provide a safety message to a soft V2X vehicle. A message for soft V2X communication may include a header (Header), a construction site area container (WorkzoneContainer), a setting container (SettingContainer), and an event container (EventContainer).

FIG. 20 (c) shows a header configuration of a message for soft V2X communication. A header for soft V2X communication has a configuration different from that of the conventional ITS. To distinguish a header device for V2X communication, a station ID (StationID), a message type (MessageType) for identifying a message type, a message generated time (MessageGenTime), a message emergency level (MessageEmergencyLevel), and a station position (StationPosition) indicating its position if a station is a moving object. A construction site area container (WorkZoneContainer), a setting container (SettingContainer) and an event container (EventContainer) may be the same as described in the aforementioned direct communication.

Figure 21:
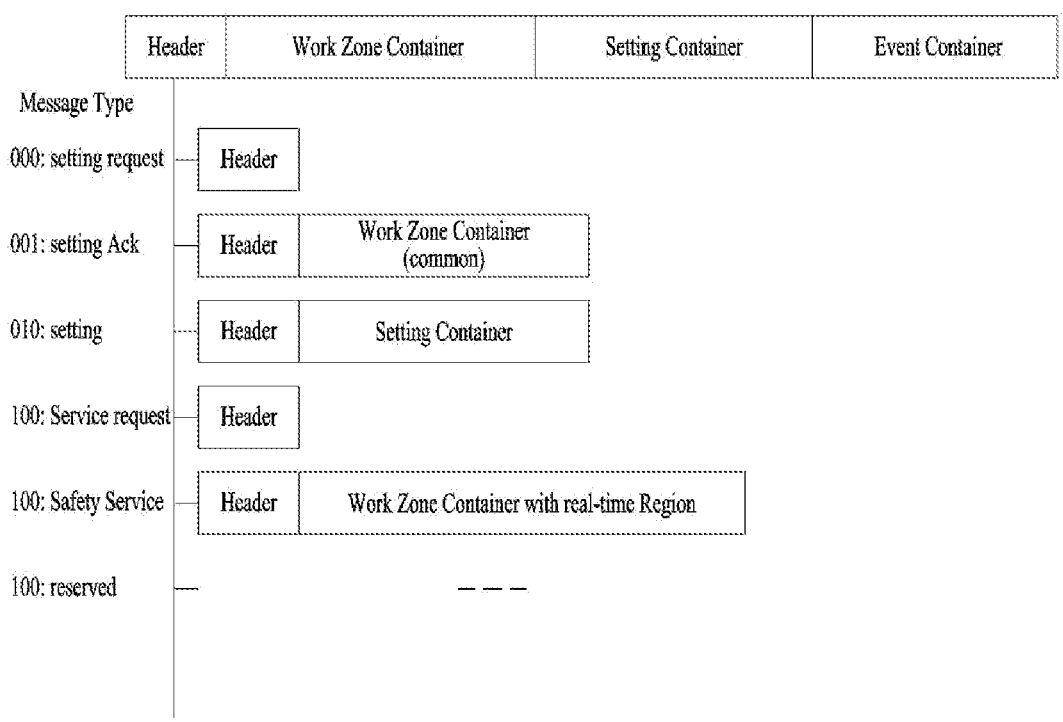

FIG. 21 shows a structure of a soft V2X message per message type.

Soft V2X communication has a message configured to match a status by performing communication over a Uu interface. For example, if a message type is setting request (000), a message may include a header only without data. if a message type is setting Ack (001), a message may include a header and a construction site area container (work zone container). The construction site area container (work zone container) may be construction site common information managed by a soft V2X server. If a message type is setting (010), a message may include a header and a setting container. The setting container may include real-time measured construction site area information (PositionList). If a message type is service request (100), a message may include a header only without data. A service request message may be used for a soft V2X vehicle to make a service request to a soft V2X server. Finally, if a message type is safety service (101), a message may include a header and a construction site area container (work zone container) in which a position list may be included.

Figure 22:
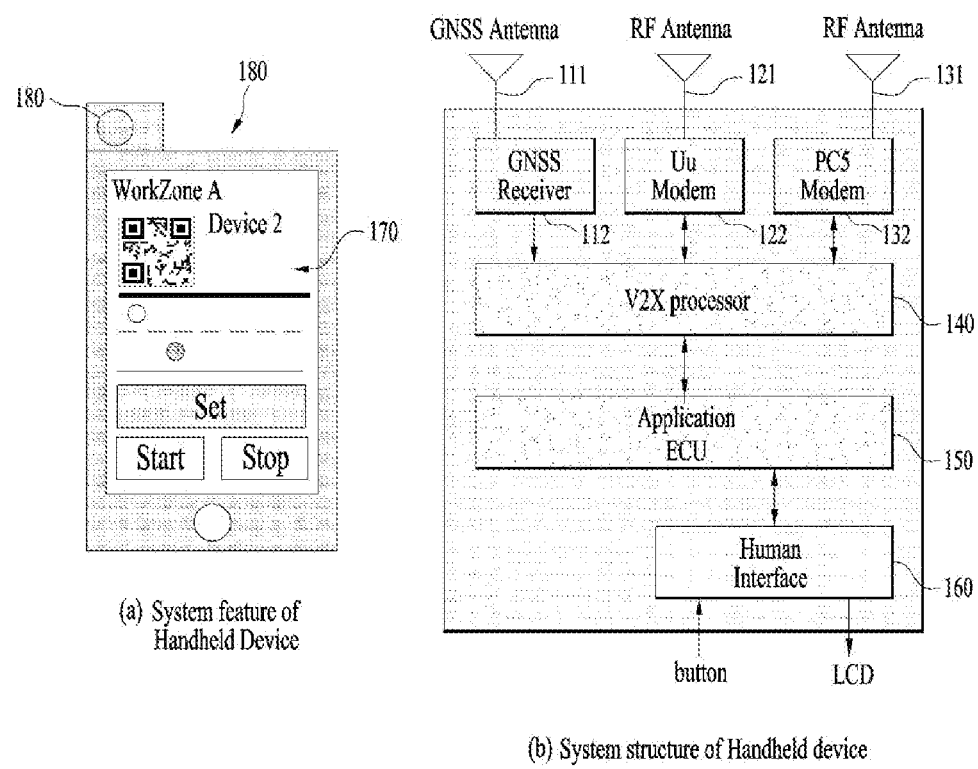

FIG. 22 is a diagram illustrating a structure of a dedicated auxiliary device.

FIG. 22 (a) illustrates an exterior feature of a dedicated auxiliary device. The dedicated auxiliary device may include a touchable display 170 and a camera 180 capable of recognizing a QR code. FIG. 22 (b) illustrates a configuration of a dedicated auxiliary device. The dedicated auxiliary device may include an RF antenna 131 capable of performing direct communication (PC5 or DSRC) and a radio modem 132. The dedicated auxiliary device may include an RF antenna 121 capable of performing cellar communication with a BS (UU interface) and a radio modem 122. The dedicated auxiliary device may include a GNSS antenna 111 and a GNSS receiver 112, capable of acquiring location information. The dedicated auxiliary device may include a V2X processor 140 capable of V2X communication, an application ECU 150 programed with a construction site guidance service, and a human interface block 160 capable of inputting a button or checking a state via a display.

Figure 23:
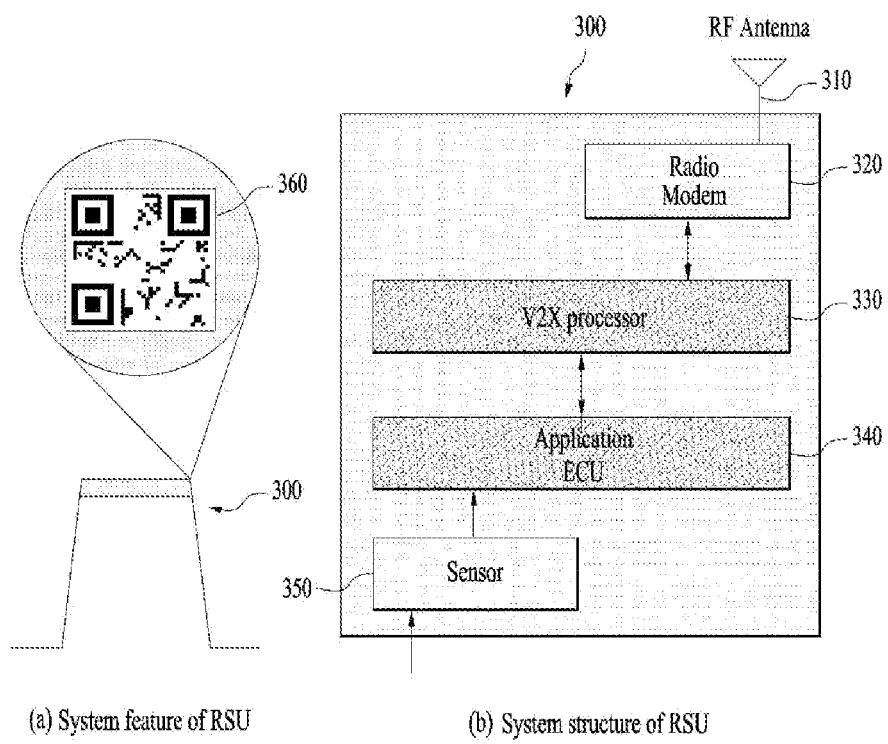

FIG. 23 shows a structure of a construction site guidance device.

Referring to FIG. 23 (a), a construction site guidance device may include a QR code 3650 for unique identification of a device. A dedicated auxiliary device may identify each construction site guidance device by recognizing a QR code.

Referring to FIG. 23 (b), a construction site guidance device may include an RF antenna 310 capable of communication (PC5 interface only), a radio modem 320, a V2X processor 330 capable of V2X communication, an application ECU 340 programmed with a construction site guidance service, and a sensor 350 capable of external shock detection. Unlike the dedicated auxiliary device, the construction site guidance device fails to include a device for GNSS communication, a device for Uu communication, and a human interface device. Accordingly, as a structure of the construction site guidance device is simplified, installation costs can be reduced.

In comparison with the related art technology, a system configuration needs to be changed to configure a construction site guidance device using a dedicated auxiliary device. A message for construction site configuration may be added to the V2X processor 140 of the dedicated device, and algorithm for system operation and management may be added to the application ECU 150. In addition, the V2X processor 230 of the construction site guidance device may be modified to acquire location information and construction site information from the dedicated device, and the application ECU 240 of the construction site guidance device may be modified for algorithm addition.

[Operation of Construction Site Guidance System]

Operations of devices (dedicated auxiliary device, construction site guidance device, soft V2X server) are described as follows.

Figure 24:
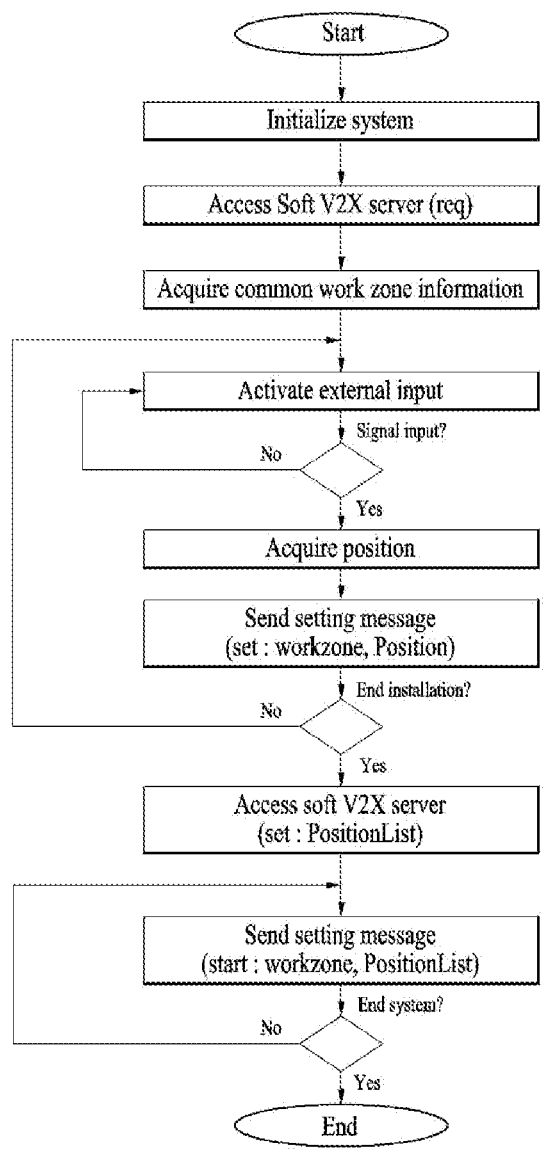

FIG. 24 is a flowchart of an operation of a dedicated auxiliary device.

Referring to FIG. 24, once a system of a dedicated auxiliary device starts, the system of the device may be initialized. Thereafter, for construction site area installation, a construction site information request may be made to a soft V2X server via a Uu interface. After using a setting request message, construction site common information data (WorkZone Common Data) replied by the soft V2X server may be acquired. (Setting ACK message decoding), if an initial process ends by acquiring the information, a construction site guidance device is installed. If the installation is complete, information of the device is acquired using a dedicated device. If there is a QR code in a construction site guidance device as an external input activation operation, the construction site guidance device obtains a device ID from a camera or QR code reader of the dedicated auxiliary device. Simultaneously, the dedicated auxiliary device acquires a corresponding location from a GPS device. Thereafter, the dedicated auxiliary device transmits construction site information and location information over a setting message. In addition, the dedicated auxiliary device saves the device ID and the location to a DB. This process is repeated until the installation is ended. Once the installation is complete, the dedicated device may access a soft V2X server and send a setting message to forward a collected position list. Thereafter, the collected position list value and construction site information may be transmitted to construction site guidance devices until the system ends.

Figure 25:
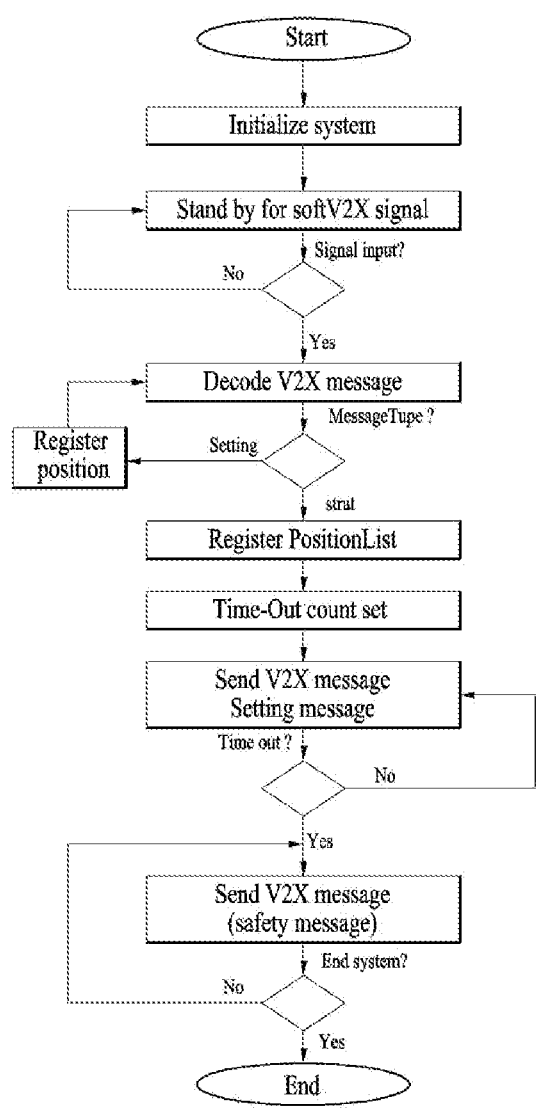

FIG. 25 is a flowchart of an operation of a construction site guidance device.

Referring to FIG. 25, once a system of a construction site guidance device starts, the system of the device may be initialized. Thereafter, the construction site guidance device enters a V2X reception mode and waits for a setting signal. If the setting signal is received, a V2X message is decoded. If this signal is a setting message sent by a dedicated auxiliary device, the construction site guidance device registers a location transmitted by the dedicated auxiliary device as a location of its own. The construction site guidance device waits for a V2X message to receive until receiving a start signal indicating that the installation was complete. If installation of the construction site guidance device is complete, the construction site guidance device receives a position list from the dedicated auxiliary device and generates a safety message in a facilities layer of its own using the received list. Thereafter, the construction site guidance device activates a counter using a time-out value received over the setting message. Thereafter, to propagate the setting message to surrounding construction site guidance devices, the construction site guidance device periodically sends the setting message. If the time-out counter operates, each of the construction site guidance devices may periodically transmit a safety message for a construction site safety service, which is generated from a facilities layer.

Figure 26:
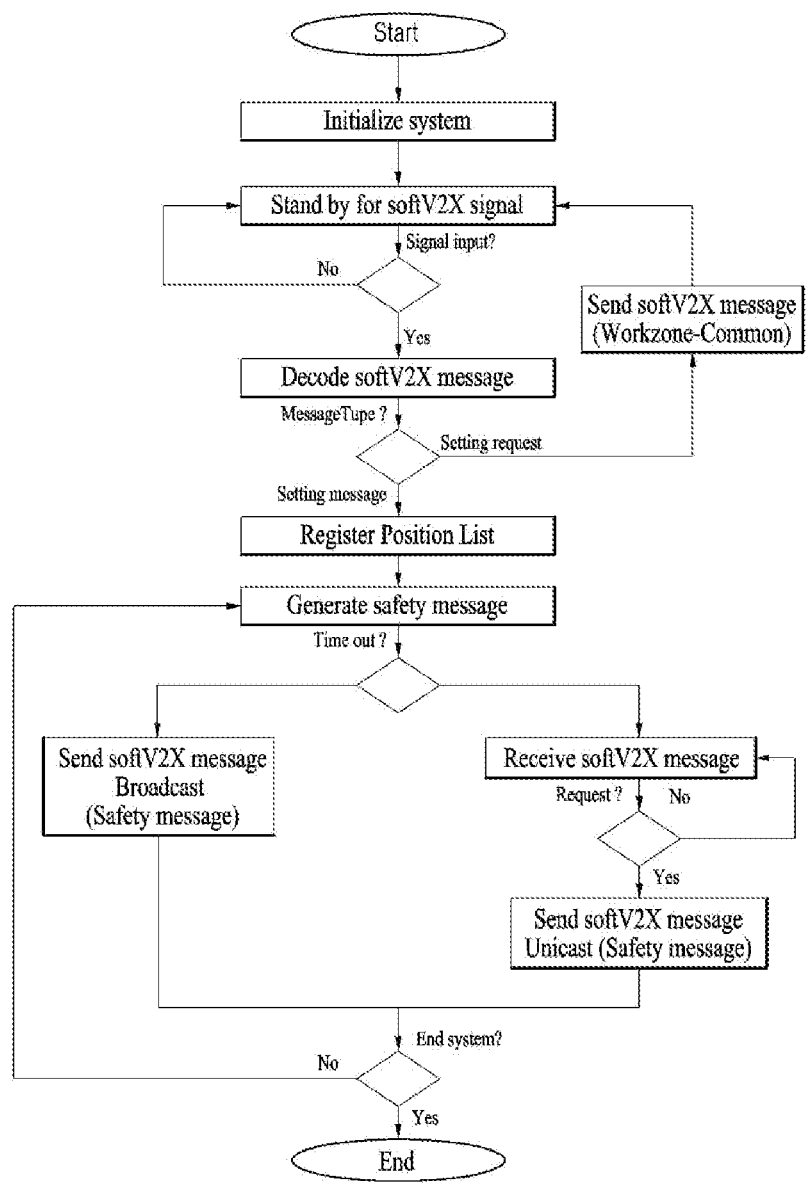

FIG. 26 is a flowchart of an operation of a soft V2X server.

Referring to FIG. 26, once a system starts, the system of a device may be initialized. Thereafter, a soft V2X server waits for a soft V2X message from a dedicated auxiliary device. If the dedicated device sends a setting request message, the soft V2X server forward construction site common information matching a corresponding area to the dedicated auxiliary device. (SoftV2X message: WorkZone Common data). Thereafter, if installation is complete by communication between the dedicated auxiliary device and a construction site guidance device, a position list value is received from the dedicated auxiliary device over a setting message (start), and a softV2X-saftey message is generated using the received value. Construction site information is then transmitted to surrounding soft V2X devices to match a broadcast operation and a unicast operation according to the configuration of the soft V2X server that provides a service via a Uu interface. Namely, in case of a broadcast mode, the soft V2X server periodically forwards construction sit information to all soft V2X UEs. In case of a unicast mode, the soft V2X server waits for a request signal received from each UE and then forwards construction site information to the corresponding device.

Figure 27:
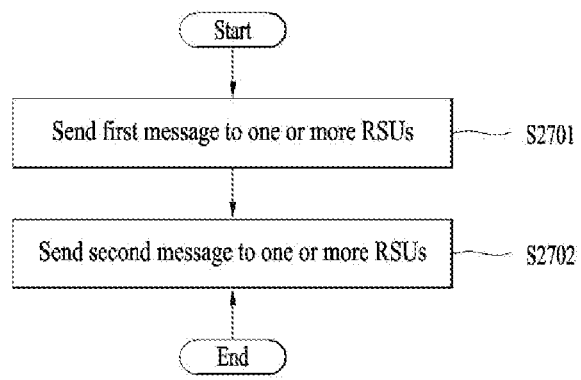

FIG. 27 is a diagram to describe an operation of a dedicated auxiliary device according to embodiment(s) of the present specification.

Referring to FIG. 27, a UE may send a first message and a second message to one or more RSUs. The one or more RSUs may include the aforementioned construction site guidance device(s). The UE may include the aforementioned dedicated auxiliary device. The first message may include the aforementioned setting message of setting mode. The second message may include the aforementioned setting message of the start mode.

In step S2701, the UE sends the first message to the one or more RSUs. In this case, the dedicated auxiliary device may recognize unique information (e.g., QR code, barcode, etc.) of each of the RSUs, receive GPS location information of the corresponding RSU, and send the first message having the received information contained therein to the RSU. Since the locations of the RSUs are different from each other, the first message may contain information different per RSU. The UE repeats this step for each of the one or more RSUs. Each of the RSUs may receive the first message containing the location information of the corresponding RSU. Since the location informations of the one or more RSUs can be acquired, it is advantageous in that it is unnecessary to install GPS related device(s) in the one or more RSUs.

In step S2702, the UE sends the second message to the one or more RSUs. In this case, the UE may transmit the second message, in which a position list of collecting the locations information of the RSUs acquired in the step S2701 is contained, to the one or more RSUs. In this case, the second message sent to the one or more RSUs may contain the same information. The one or more RSUs share the second message in a manner of transceiving the message with each other. The UE may send the second message to the RUS(s) in coverage only. Having received the second message, the RSU may send the second message to other RSUs around. The second message may contain a position list of the one or more RSUs.

The UE may make a request for information on a construction site area at which the one or more RSUs are located or construction site common information, to a sift V2X server and then receive it. The construction site common information may include information on a construction type or a construction period. The dedicated auxiliary device may receive the construction site common information from the soft V2X server and include it in the first or second message. The RSU may receive the first message and the second message and then generate a safety message, which is to be sent to surrounding vehicles, using the second message. The soft V2X server or a BS may receive the second message containing a position list of the one or more RSUs from the UE and then send a safety message to vehicles using the second message. The safety message may contain construction site common information and the position list of the one or more RSUs. Since the one or more RSUs are disposed along a construction site perimeter, the position list of the one or more RSUs may mean information on a construction site area that changes in real time.

Although the proposed method takes the embodiment for construction site danger information guidance as an example, an I2I communication system and message structure may be available for the close operation of a system serviced in a manner of configuring multi-infrastructure in an ITS system as well as the corresponding service. To this end, if data related to a construction site area container and a setting container of an I2I message are added later, the proposed method is applicable to other services.

Provided in the present specification is a method of raising an equality of a service by adding I2I communication to a service provided in the V2X service of the related art. According to the related art, it is inconvenient for a user to preconfigure or manage a construction site area in direct. As devices self-exchange and self-service information using a construction site guidance system over I2I communication proposed in the present specification, a construction site area changing in real time can be provided to vehicles conveniently and accurately. And, installation costs of the construction site guidance system can be reduced. Moreover, by providing a construction site guidance service together with a V2X server, various services can be provided more accurately.

Example of Communication System to which the Present Disclosure is Applied

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 28:
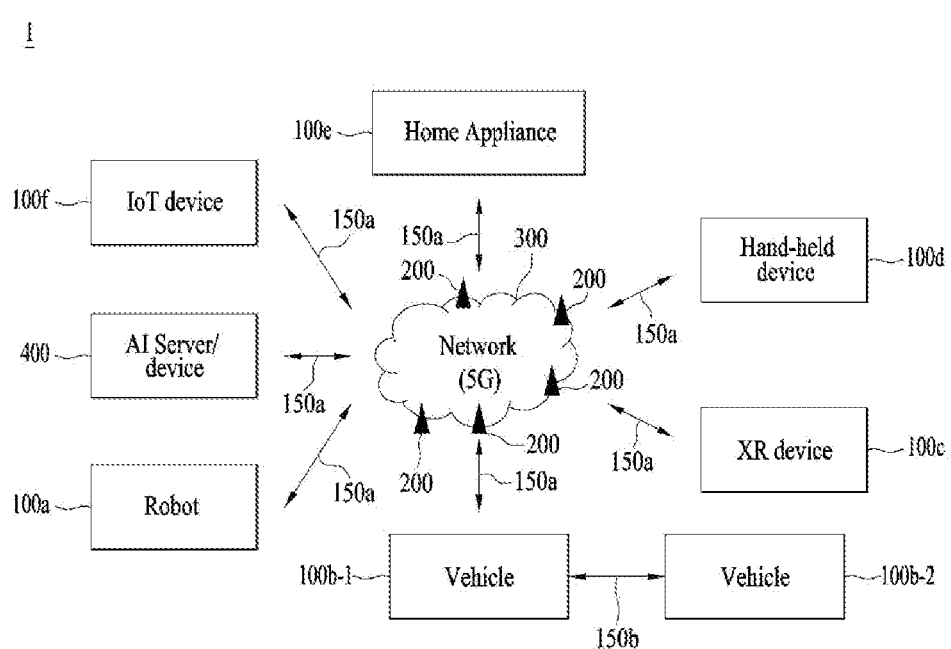
FIGS. 28 to 37 are diagrams illustrating various devices to which embodiment(s) may be applied.

FIG. 28 illustrates a communication system applied to the present disclosure.

Referring to FIG. 28, a communication system applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g., relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Devices to which the Present Disclosure is Applied

Figure 29:
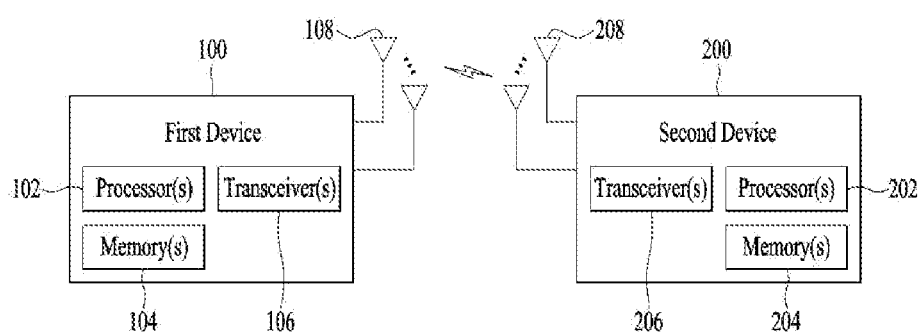

FIG. 29 illustrates wireless devices applicable to the present disclosure.

Referring to FIG. 29, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 28.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of a Signal Process Circuit to which the Present Disclosure is Applied

Figure 30:
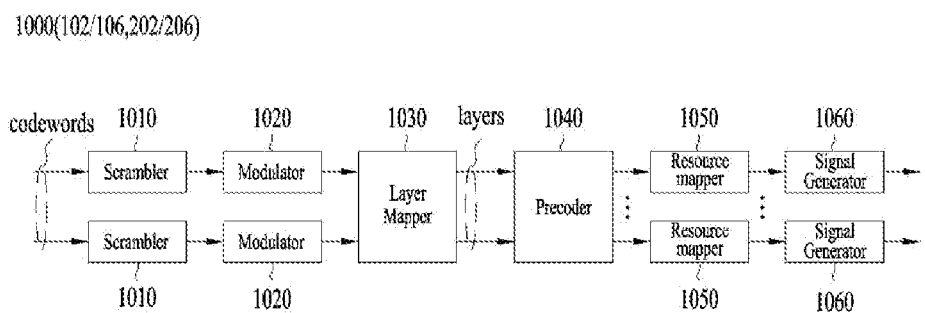

FIG. 30 illustrates a signal process circuit for a transmission signal.

Referring to FIG. 30, a signal processing circuit 1000 may include scramblers 1010, modulators 1020, a layer mapper 1030, a precoder 1040, resource mappers 1050, and signal generators 1060. An operation/function of FIG. 30 may be performed, without being limited to, the processors 102 and 202 and/or the transceivers 106 and 206 of FIG. 29. Hardware elements of FIG. 30 may be implemented by the processors 102 and 202 and/or the transceivers 106 and 206 of FIG. 29. For example, blocks 1010 to 1060 may be implemented by the processors 102 and 202 of FIG. 29. Alternatively, the blocks 1010 to 1050 may be implemented by the processors 102 and 202 of FIG. 29 and the block 1060 may be implemented by the transceivers 106 and 206 of FIG. 29.

Codewords may be converted into radio signals via the signal processing circuit 1000 of FIG. 30. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 30. For example, the wireless devices (e.g., 100 and 200 of FIG. 29) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 31:
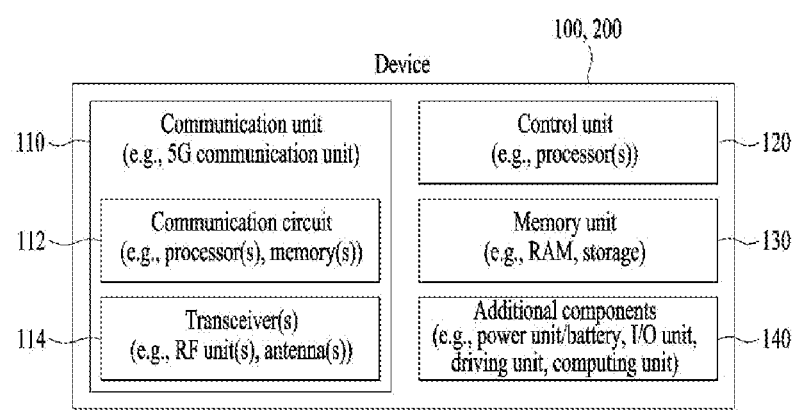

Application Example of a Wireless Device to which the Present Disclosure is Applied FIG. 31 illustrates another example of a wireless device applied to the present disclosure. The wireless device may be implemented in various forms according to a use-case/service (refer to FIG. 28).

Referring to FIG. 31, wireless devices 100 and 200 may correspond to the wireless devices 100 and 200 of FIG. 29 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 29. For example, the transceiver(s) 114 may include the one or more transceivers 106 and 206 and/or the one or more antennas 108 and 208 of FIG. 29. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 28), the vehicles (100b-1 and 100b-2 of FIG. 28), the XR device (100c of FIG. 28), the hand-held device (100d of FIG. 28), the home appliance (100e of FIG. 28), the IoT device (100f of FIG. 28), a digital broadcast terminal, a hologram device, a public safety device, an MTC device, a medicine device, a fintech device (or a finance device), a security device, a climate/environment device, the AI server/device (400 of FIG. 28), the BSs (200 of FIG. 28), a network node, etc. The wireless device may be used in a mobile or fixed place according to a use-example/service.

In FIG. 31, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 31 will be described in detail with reference to the drawings.

Example of Hand-Held Device to which the Present Disclosure is Applied

Figure 32:
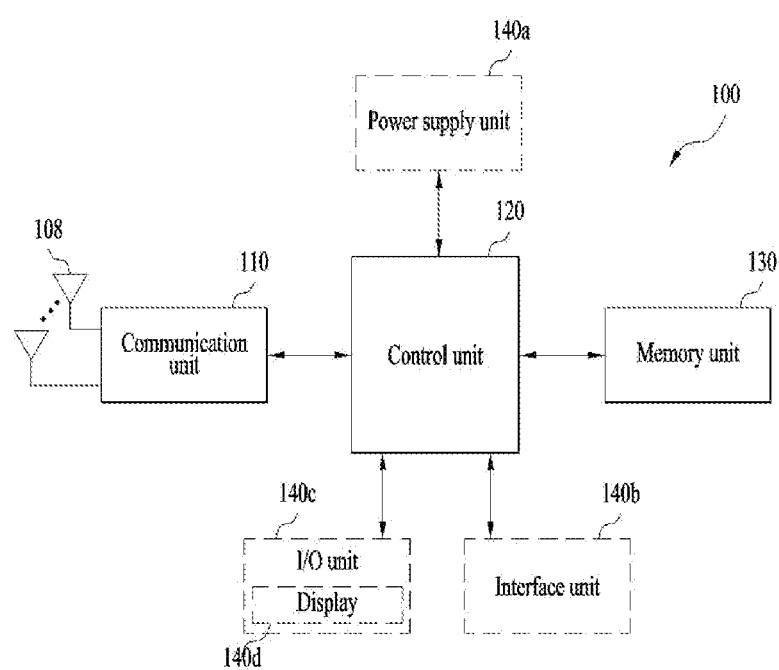

FIG. 32 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 32, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 31, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 33:
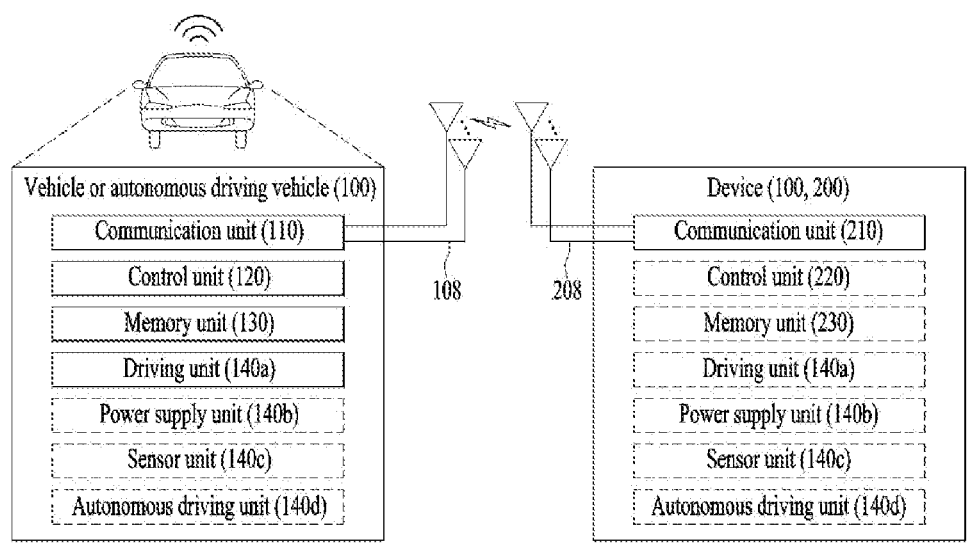

Example of a Vehicle or an Autonomous Driving Vehicle to which the Present Disclosure is Applied FIG. 33 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 33, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 31, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of AR/VR and Vehicle to which the Present Disclosure is Applied

Figure 34:
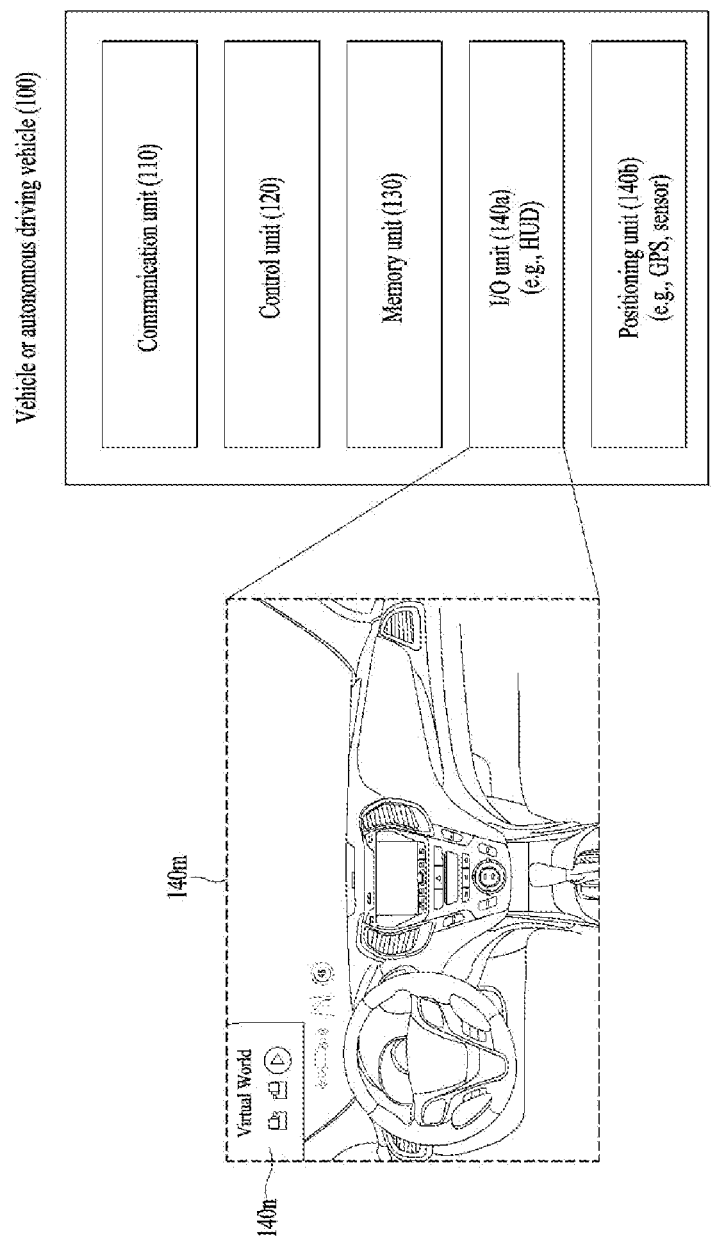

FIG. 34 illustrates a vehicle applied to the present disclosure. The vehicle may be implemented as a transport means, an aerial vehicle, a ship, etc.

Referring to FIG. 34, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 31.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormality to neighboring vehicles through the communication unit 110. According to situation, the control unit 120 may transmit the vehicle position information and the information about driving/vehicle abnormality to related organizations.

Examples of XR Device to which the Present Disclosure is Applied

Figure 35:
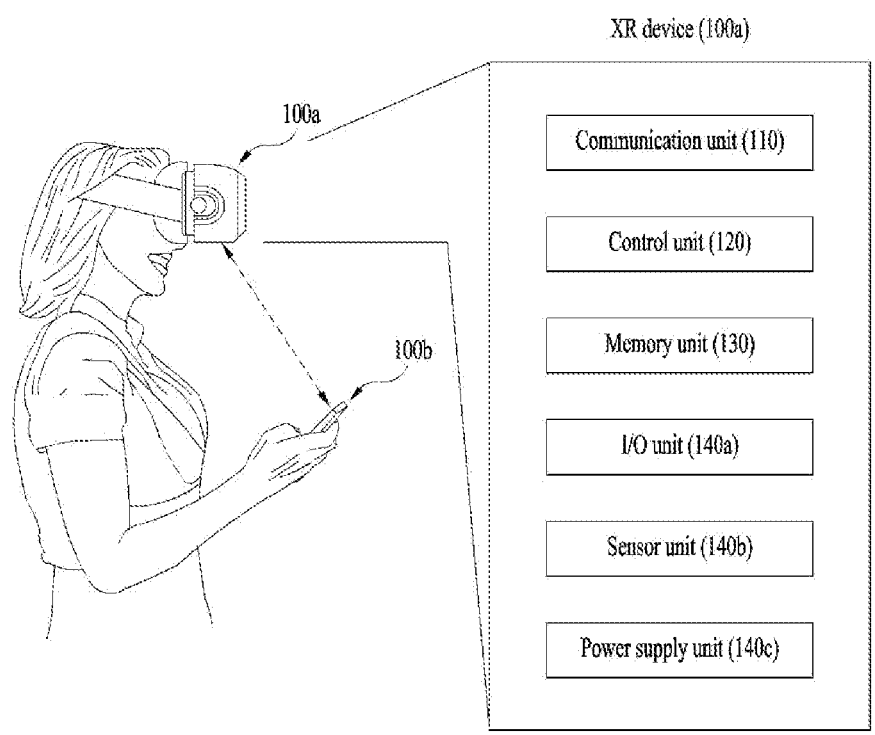

FIG. 35 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 35, an XR device 100a may include a communication unit 110, a control unit 120, a memory unit 130, an I/O unit 140a, a sensor unit 140b, and a power supply unit 140c. Herein, the blocks 110 to 130/140a to 140c correspond to the blocks 110 to 130/140 of FIG. 31, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100a. For example, the control unit 120 may be configured to control and/or perform procedures such as video/image acquisition, (video/image) encoding, and metadata generation and processing. The memory unit 130 may store data/parameters/programs/code/commands needed to drive the XR device 100a/generate XR object. The I/O unit 140a may obtain control information and data from the exterior and output the generated XR object. The I/O unit 140a may include a camera, a microphone, a user input unit, a display unit, a speaker, and/or a haptic module. The sensor unit 140b may obtain an XR device state, surrounding environment information, user information, etc. The sensor unit 140b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140c may supply power to the XR device 100a and include a wired/wireless charging circuit, a battery, etc.

For example, the memory unit 130 of the XR device 100a may include information (e.g., data) needed to generate the XR object (e.g., an AR/VR/MR object). The I/O unit 140a may receive a command for manipulating the XR device 100a from a user and the control unit 120 may drive the XR device 100a according to a driving command of a user. For example, when a user desires to watch a film or news through the XR device 100a, the control unit 120 transmits content request information to another device (e.g., a hand-held device 100b) or a media server through the communication unit 130. The communication unit 130 may download/stream content such as films or news from another device (e.g., the hand-held device 100b) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140a/sensor unit 140b.

The XR device 100a may be wirelessly connected to the hand-held device 100b through the communication unit 110 and the operation of the XR device 100a may be controlled by the hand-held device 100b. For example, the hand-held device 100b may operate as a controller of the XR device 100a. To this end, the XR device 100a may obtain information about a 3D position of the hand-held device 100b and generate and output an XR object corresponding to the hand-held device 100b.

Examples of Robot to which the Present Disclosure is Applied

Figure 36:
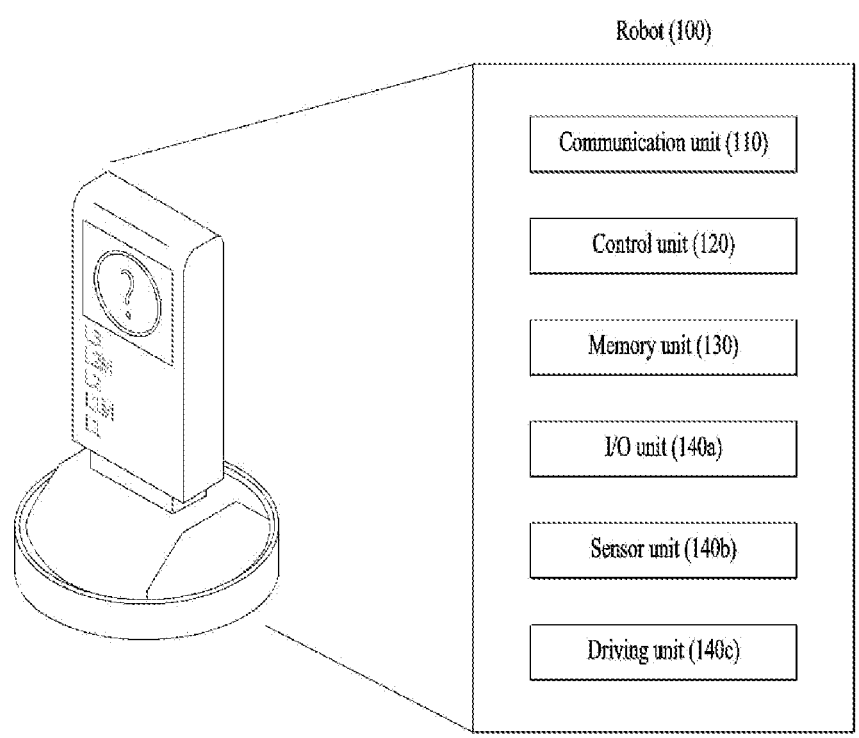

FIG. 36 illustrates a robot applied to the present disclosure. The robot may be categorized into an industrial robot, a medical robot, a household robot, a military robot, etc., according to a used purpose or field.

Referring to FIG. 36, a robot 100 may include a communication unit 110, a control unit 120, a memory unit 130, an I/O unit 140a, a sensor unit 140b, and a driving unit 140c. Herein, the blocks 110 to 130/140a to 140c correspond to the blocks 110 to 130/140 of FIG. 31, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140*a* may obtain information from the exterior of the robot 100 and output information to the exterior of the robot 100. The I/O unit 140*a* may include a camera, a microphone, a user input unit, a display unit, a speaker, and/or a haptic module. The sensor unit 140*b* may obtain internal information of the robot 100, surrounding environment information, user information, etc. The sensor unit 140*b* may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140*c* may perform various physical operations such as movement of robot joints. In addition, the driving unit 140*c* may cause the robot 100 to travel on the road or to fly. The driving unit 140*c* may include an actuator, a motor, a wheel, a brake, a propeller, etc.

Examples of AI Device to which the Present Disclosure is Applied

Figure 37:
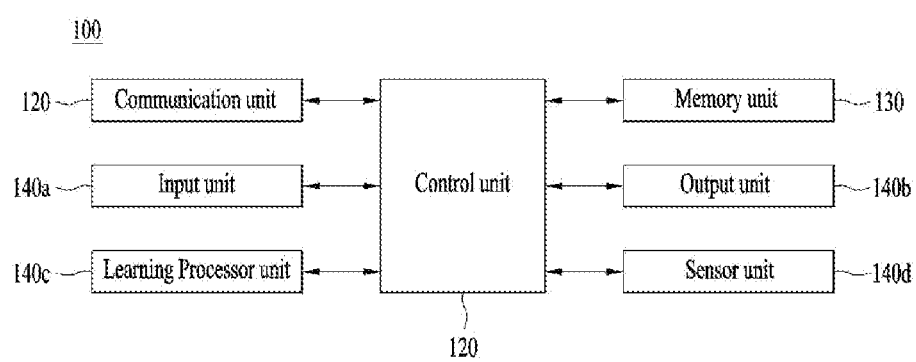

FIG. 37 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 37, an AI device 100 may include a communication unit 110, a control unit 120, a memory unit 130, an I/O unit 140*a*/140*b*, a learning processor unit 140*c*, and a sensor unit 140*d*. The blocks 110 to 130/140*a* to 140*d* correspond to blocks 110 to 130/140 of FIG. 31, respectively.

The communication unit 110 may transmit and receive wired/radio signals (e.g., sensor information, user input, learning models, or control signals) to and from external devices such as other AI devices (e.g., 100*x*, 200, or 400 of FIG. 28) or an AI server (e.g., 400 of FIG. 28) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information that is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140*c* or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140*c* or transmit the collected information to an external device such as an AI server (400 of FIG. 28). The collected history information may be used to update a learning model.

The memory unit 130 may store data for supporting various functions of the AI device 100. For example, the memory unit 130 may store data obtained from the input unit 140*a*, data obtained from the communication unit 110, output data of the learning processor unit 140*c*, and data obtained from the sensor unit 140. The memory unit 130 may store control information and/or software code needed to operate/drive the control unit 120.

The input unit 140*a* may acquire various types of data from the exterior of the AI device 100. For example, the input unit 140*a* may acquire learning data for model learning, and input data to which the learning model is to be applied. The input unit 140*a* may include a camera, a microphone, and/or a user input unit. The output unit 140*b* may generate output related to a visual, auditory, or tactile sense. The output unit 140*b* may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140*c* may learn a model consisting of artificial neural networks, using learning data. The learning processor unit 140*c* may perform AI processing together with the learning processor unit of the AI server (400 of FIG. 28). The learning processor unit 140*c* may process information received from an external device through the communication unit 110 and/or information stored in the memory unit 130. In addition, an output value of the learning processor unit 140*c* may be transmitted to the external device through the communication unit 110 and may be stored in the memory unit 130.

INDUSTRIAL APPLICABILITY

The above-described embodiments of the present disclosure are applicable to various mobile communication systems.

What is claimed is:

1. A method of performing an operation for a user equipment in a wireless communication system, the method comprising:
    transmitting a first message to one or more Road Side Units (RSUs); and
    transmitting a second message to the one or more RSUs,
    wherein the first message includes location information of each of the one or more RSUs acquired in a manner of recognizing unique information of each of the one or more RSUs and
    wherein the second message includes a position list of collecting location information of each of the one or more RSUs.

2. The method of claim 1, wherein the second message is transceived between the one or more RSUs.

3. The method of claim 1, wherein the one or more RSUs transmit a safety message to a vehicle based on the second message and wherein the safety message includes construction site area information of a construction site area having the one or more RSUs located therein.

4. The method of claim 1, further comprising:
    making a request for construction site common information to a base station or a server for the construction site; and
    receiving the construction site common information from the base station or the server.

5. The method of claim 4, wherein each of the first message and the second message includes the construction site common information.

6. The method of claim 4, wherein the construction site common information includes information on a construction type or a construction period.

7. The method of claim 1, further comprising:
transmitting the second message to a base station or a server for communication between UEs,
wherein the base station or the sever transmits a safety message to a vehicle based on the second message.

8. A user equipment in a wireless communication system, the user equipment comprising:
at least one processor; and
at least one computer memory operatively connected to the at least one processor and storing instructions enabling the at least one processor to perform operations when executed, the operations comprising:
transmitting a first message to one or more Road Side Units (RSUs); and
transmitting a second message to the one or more RSUs,
wherein the first message includes location information of each of the one or more RSUs acquired in a manner of recognizing unique information of each of the one or more RSUs and
wherein the second message includes a position list of collecting location information of each of the one or more RSUs.

9. The user equipment of claim 8, wherein the user equipment comprises an autonomous vehicle or is included in the autonomous vehicle.

10. A non-transitory computer-readable storage medium configured to store at least one computer program including an instruction enabling at least one processor to perform operations for a User Equipment (UE) when executed by the at least one processor, the operations comprising:
transmitting a first message to one or more Road Side Units (RSUs); and
transmitting a second message to the one or more RSUs,
wherein the first message includes location information of each of the one or more RSUs acquired in a manner of recognizing unique information of each of the one or more RSUs and
wherein the second message includes a position list of collecting location information of each of the one or more RSUs.

* * * * *